(12) United States Patent
Chang et al.

(10) Patent No.: US 8,952,928 B2
(45) Date of Patent: Feb. 10, 2015

(54) DEVICE AND METHOD FOR DETECTING TOUCH SCREEN

(71) Applicants: Chin-Fu Chang, Taipei (TW); Chi-Hao Tang, Taipei (TW)

(72) Inventors: Chin-Fu Chang, Taipei (TW); Chi-Hao Tang, Taipei (TW)

(73) Assignee: Egalax_Empia Technology Inc., Taipei (TW)

( * ) Notice: Subject to any disclaimer, the term of this patent is extended or adjusted under 35 U.S.C. 154(b) by 0 days.

(21) Appl. No.: 13/650,649

(22) Filed: Oct. 12, 2012

(65) Prior Publication Data

US 2013/0038573 A1    Feb. 14, 2013

Related U.S. Application Data

(63) Continuation-in-part of application No. 12/407,100, filed on Mar. 19, 2009, now Pat. No. 8,546,705.

(60) Provisional application No. 61/577,181, filed on Dec. 19, 2011, provisional application No. 61/547,186, filed on Oct. 14, 2011.

(30) Foreign Application Priority Data

Jan. 9, 2008   (TW) .............................. 098100567 A
May 19, 2008  (TW) .............................. 097109691 A

(51) Int. Cl.
| | | |
|---|---|---|
| G06F 3/041 | (2006.01) | |
| G06F 3/045 | (2006.01) | |
| H03K 17/94 | (2006.01) | |
| H03M 11/00 | (2006.01) | |
| G01R 27/26 | (2006.01) | |
| G06F 3/044 | (2006.01) | |

(52) U.S. Cl.
CPC .............. *G06F 3/044* (2013.01); *G06F 3/0418* (2013.01)
USPC .............. 345/174; 345/173; 341/20; 324/658

(58) Field of Classification Search
CPC ................ G06F 2203/041; G06F 2203/04105; G06F 2203/04108; G06F 3/0412; G06F 3/041; G06F 3/044; G06F 2203/04112; G06F 3/0354; G06F 3/03547
USPC .......... 345/173–174; 710/5; 324/658; 341/20
See application file for complete search history.

(56) References Cited

U.S. PATENT DOCUMENTS

| | | | |
|---|---|---|---|
| 5,194,862 A * | 3/1993 | Edwards .......................... 341/20 |
| 2006/0062139 A1* | 3/2006 | Oozeki et al. ................. 369/300 |
| 2006/0146038 A1* | 7/2006 | Park et al. ...................... 345/173 |
| 2007/0240914 A1 | 10/2007 | Lai et al. |
| 2008/0062139 A1* | 3/2008 | Hotelling et al. ............. 345/173 |
| 2008/0277171 A1 | 11/2008 | Wright |

(Continued)

*Primary Examiner* — Quan-Zhen Wang
*Assistant Examiner* — Lin Li
(74) *Attorney, Agent, or Firm* — WPAT, PC; Justin King

(57) ABSTRACT

The invention discloses a full screen driven detection. A driving signal is simultaneously provided to all first conductive strips arranged in parallel in a first direction in a touch screen, and mutual capacitive signals are detected from all second conductive strips arranged in parallel in a second direction. The mutual capacitive signals can be used for determining whether an external conductive object coupled to the ground is touching or approaching the touch screen or not even if water or other conductive object not coupled to ground is on the touch screen. Thus, the baseline of the mutual capacitive signals can be updated if the touch screen is not touched or approached by any external conductive object coupled to ground over a predetermined period of time.

20 Claims, 13 Drawing Sheets

(56) References Cited

U.S. PATENT DOCUMENTS

| | | |
|---|---|---|
| 2008/0309633 A1 | 12/2008 | Hotelling et al. |
| 2009/0063715 A1* | 3/2009 | de Cesare et al. ............. 710/5 |
| 2009/0109190 A1 | 4/2009 | Elias |
| 2009/0159344 A1 | 6/2009 | Hotelling et al. |
| 2010/0060608 A1* | 3/2010 | Yousefpor ............. 345/174 |
| 2012/0043973 A1* | 2/2012 | Kremin ............. 324/658 |

* cited by examiner

DEVICE AND METHOD FOR DETECTING TOUCH SCREEN

CROSS REFERENCE TO RELATED PATENT APPLICATION

This patent application claims the domestic priority of the U.S. provisional applications 61/547,186 filed on Oct. 14, 2011 and 61/577,181 filed on Dec. 19, 2011. This patent application is also a continuation-in-part of the U.S. patent application Ser. No. 12/407,100 filed on May 19, 2009, which claims the foreign priority of Taiwan patent applications TW097109691 filed on May 19, 2008 and TW098100567 filed on Jan. 9, 2009.

BACKGROUND OF THE INVENTION

1. Field of the Invention

The present invention is related to a capacitive touch screen, and more particularly, a capacitive touch screen that avoids misjudgment due to water thereon.

2. Description of the Prior Art

A conventional mutual capacitive sensor includes an insulating surface layer, a first conductive layer, a dielectric layer, a second conductive layer. The first conductive layer and the second conductive layer have a plurality of first conductive strips and a plurality of second conductive strips, respectively. Each of these conductive strips can be made up by a plurality of conductive pads and connecting lines connected to the conductive pads in series.

In the process of mutual capacitive detection, one of the first conductive layer and the second conductive layer is driven, while the other of the first conductive layer and the second conductive layer is detected. For example, a driving signal is sequentially provided to each first conductive strip, and corresponding to each first conductive strip provided with the driving signal, signals from all of the second conductive strips are detected, which represent capacitive coupling signals at the intersections between the first conductive strip provided with the driving signal and all the second conductive strips. As a result, capacitive coupling signals at the intersections between all the first and second conductive strips are obtained to form an image of capacitive values.

The image of capacitive values at the time when there is no external touches is obtained as a reference. By comparing the difference between the reference image and the image of capacitive values later detected, the touch or approach of an external conductive object can be determined, and furthermore, the position touched or approached by the external conductive object can be determined.

However, if a conductive substance crosses over at least two conductive strips on the insulating surface layer, even when there is no touch or approach by any external conductive object, the image of capacitive values may change as a result of capacitive coupling between the conductive substance and the conductive strips, leading to misjudgments. For example, a water stain crossing more than two conductive strips on the insulating surface layer may cause changes in the image of capacitive values, and may be mistaken as the pressing of a finger.

From the above it is clear that prior art still has shortcomings. In order to solve these problems, efforts have long been made in vain, while ordinary products and methods offering no appropriate structures and methods. Thus, there is a need in the industry for a novel technique that solves these problems.

SUMMARY OF THE INVENTION

An objective of the present invention is to provide a full screen driven detection by simultaneously providing a driving signal to conductive strips arranged in parallel in a first direction in a touch screen, and detecting mutual capacitive signals on conductive strips arranged in parallel in a second direction, thereby determining whether there is an approach or a touch of an external conductive object that is coupled to ground. The approach or the touch of an external conductive object coupled to ground can be determined even if a water stain or other conductive object that is not coupled to ground is on the touch screen. Thus, when the touch screen is not touched or approached by any external conductive object over a period of time, the baseline of the mutual capacitive signals can be updated.

The above and other objectives of the present invention can be achieved by the following technical scheme. A device for detecting a touch screen provided by the present invention includes: the touch screen including a plurality of first conductive strips and a plurality of second conductive strips; and a controller for performing a full screen driven detection, including: simultaneously providing a driving signal to all of the first conductive strips; when all of the first conductive strips are provided with the driving signal, detecting mutual capacitive signals of all of the second conductive strips to generate a one-dimensional (1D) sensing information based on the signals of all of the second conductive strips; and determining whether at least one external conductive object coupled to ground is touching or approaching the touch screen based on the 1D sensing information; and when the controller determining the touch screen is not touched or approached by any external conductive object over a predetermined period of time based on the 1D sensing information, performing a 2D mutual capacitive detection to obtain a 2D sensing information to update reference values based on the 2D sensing information, wherein the 2D mutual capacitive detection includes: sequentially providing a driving signal to one or more different conductive strips in the first conductive strips, and providing a DC potential to all of the guarding conductive strips; each time one or more different conductive strips in the first conductive strips being provided with the driving signal, detecting the signals of all of the second conductive strips to obtain a 1D sensing information corresponding to the one or more first conductive strips being provided with the driving signal generated based on the mutual capacitive signals of all of the second conductive strips; and combining each 1D sensing information corresponding to the one or more first conductive strips being provided with the driving signal to generate a 2D sensing information.

The above and other objectives of the present invention can also be achieved by the following technical scheme. A method for detecting a touch screen in accordance with the present invention includes: providing the touch screen including a plurality of first conductive strips and a plurality of second conductive strips; performing a full screen driven detection including: simultaneously providing a driving signal to all of the first conductive strips; when all of the first conductive strips are provided with the driving signal, detecting mutual capacitive signals of all of the second conductive strips to generate a one-dimensional (1D) sensing information based on the signals of all of the second conductive strips; and determining whether at least one external conductive object coupled to ground is touching or approaching the touch screen based on the 1D sensing information; and when determining the touch screen is not touched or approached by any external conductive object over a predetermined period of time based on the 1D sensing information, performing a 2D mutual capacitive detection to obtain a 2D sensing information, and updating reference values based on the 2D sensing information, wherein the 2D mutual capacitive detection includes: sequentially providing a driving signal to one or more different conductive strips in the first conductive strips; each time one or more different conductive strips in the first conductive strips being provided with the driving signal, detecting the signals of all of the second conductive strips to obtain a 1D sensing information corresponding to the one or more first conductive strips being provided with the driving signal generated based on the mutual capacitive signals of all of the second conductive strips; and combining each 1D sensing information corresponding to the one or more first conductive strips being provided with the driving signal to generate a 2D sensing information.

By employing the above technical schemes, the present invention includes at least the following advantages and beneficial effects:

1. Full screen driven detection can determine an approach or a touch of an external conductive object coupled to ground regardless of whether any water stain or other conductive object that is not coupled to ground is on the touch screen, and can further perform an update of reference values when knowing for sure that no approach or touch of any external conductive object coupled to ground is present on the screen; and 2. Full screen driven detection is more time and power saving compared to 2D mutual capacitive detection, thus more suitable for determining whether a power-saving mode should be entered.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1A:
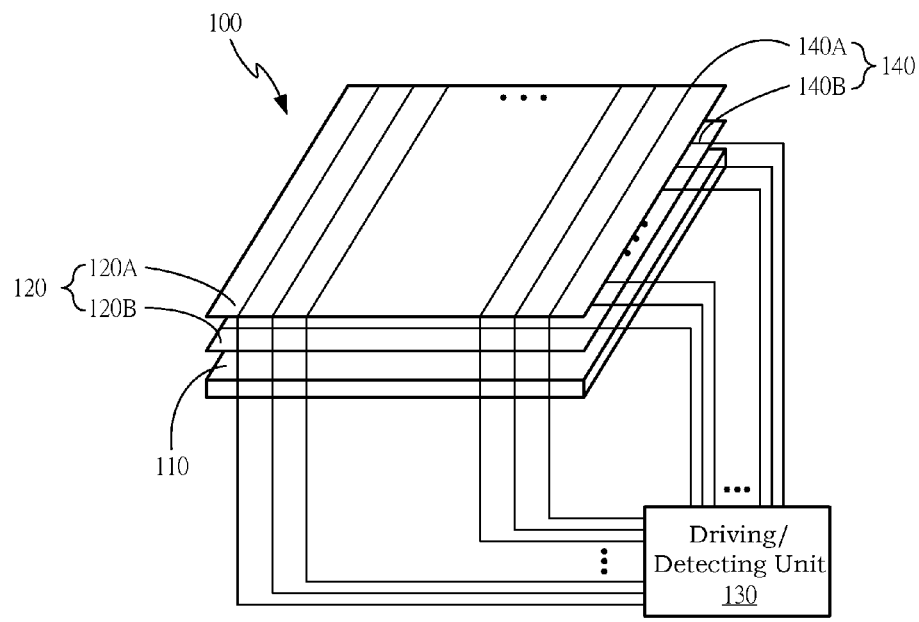
FIGS. 1A and 1B are schematic diagrams depicting a position detecting device.

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

Referring to FIG. 1A, the present invention provides a position detecting device 100, which includes a touch screen 120 and a driving/detecting unit 130. The touch screen 120 has a sensing layer. In an example of the present invention, the sensing layer may include a first sensing layer 120A and a second sensing layer 120B. The first and second sensing layers 120A and 120B each has a plurality of conductive strips 140, wherein the first conductive strips 140A of the first sensing layer 120A and the second conductive strips 140B of the second sensing layer 120B overlap each other. In another example of the present invention, the first and second conductive strips 140A and 140B are disposed on a co-planar sensing layer. The driving/detecting unit 130 produces sensing information based on signals of the conductive strips 140. In the case of self-capacitive detection, for example, conductive strips 140 that are being driven are detected. In the case of mutual-capacitive detection, a portion of the conductive strips 140 that are not being directly driven by the driving/detecting unit 130 are detected. In addition, the touch screen 120 can be disposed on a display 110. An optional shielding layer (not shown) can be interposed between the touch screen 120 and the display 110. In a preferred example of the present invention, no shielding layer is provided between the touch screen 120 and the display 110 so as to reduce the thickness of the touch screen 120.

Figure 1B:
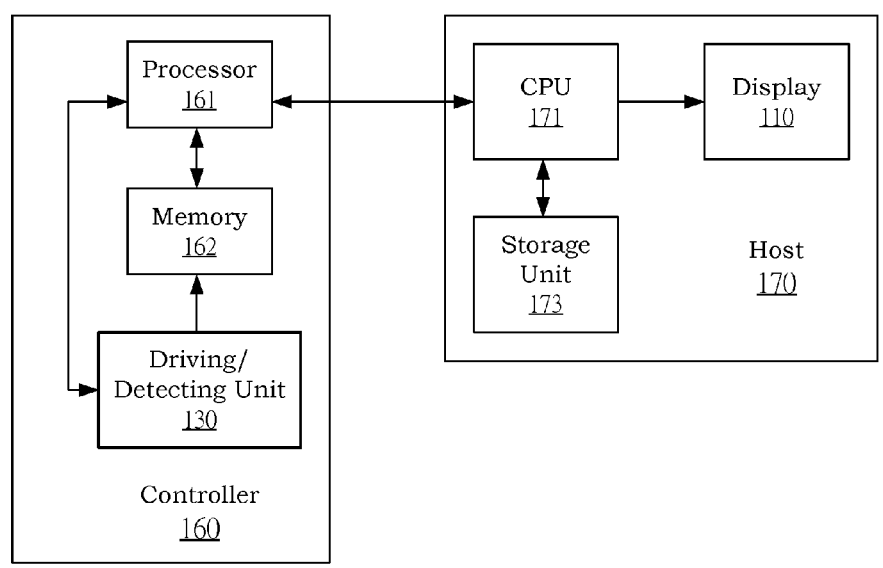

The position detecting device 100 of the present invention can be applied to a computer system as shown in FIG. 1B, which includes a controller 160 and a host 170. The controller includes the driving/detecting unit 130 to operatively couple the touch screen 120 (not shown). In addition, the controller 160 may include a processor 161 for controlling the driving/detecting unit 130 in generating the sensing information. The sensing information can be stored in a memory 162 and accessible by the processor 161. Moreover, the host 170 constitutes the main body of the computer system, and primarily includes a central processing unit 171, a storage unit 173 that can be accessed by the central processing unit 171, and the display 110 for displaying results of operations.

In another example of the present invention, a transmission interface is included between the controller 160 and the host 170. The controlling unit transmits data to the host via the transmission interface. One with ordinary skill in the art can appreciate that the transmission interface may include, but not limited to, UART, USB, I2C, Bluetooth, Wi-Fi, IR and other wireless or wired transmission interfaces. In an example of the present invention, data transmitted can be positions (e.g. coordinates), identification results (e.g. gesture codes), commands, sensing information or other information that can be provided by the controller 160.

In an example of the present invention, the sensing information can be initial sensing information generated under the control of the processor 161, and this information is passed onto the host 170 for analysis, such as position analysis, gesture determination, command identification etc. In another example of the present invention, the sensing information can be analyzed by the processor 161 first before forwarding the determined positions, gestures, commands, or the like to the host 170. The present invention includes but is not limit to this example, and one with ordinary skill in the art can readily appreciate other interactions between the controller 160 and the host 170.

Figure 1C:
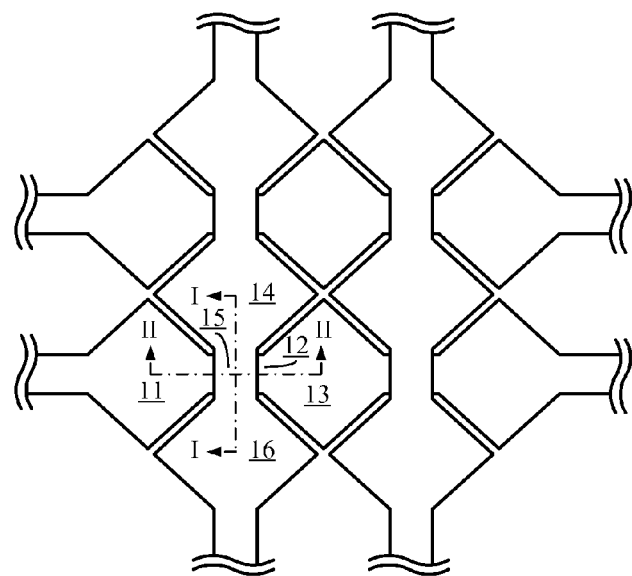
FIGS. 1C to 1F are schematic diagrams depicting the structure of a sensing layer.

Referring to FIG. 1C, a pattern of a capacitive touch screen is shown, which includes a plurality of conductive pads and a plurality of connecting lines. These connecting lines include a plurality of first connecting lines and a plurality of second connecting lines. These first connecting lines are arranged in a first direction (e.g. one of the horizontal and vertical directions) and are connected to a portion of these conductive pads to form a plurality of conductive strips arranged in the first direction. Similarly, these second connecting lines are arranged in a second direction (e.g. the other one of the horizontal and vertical directions) and are connected to another portion of these conductive pads to form a plurality of conductive strips arranged in the second direction.

These conductive strips (the first and second conductive strips) can be made of transparent or opaque materials, such as transparent Indium Tin Oxide (ITO). In terms of the structure, it can be categorized into Single ITO (SITO) structure and Double ITO (DITO) structure. One with ordinary skill in the art can appreciate that other materials can be used as the conductive strips, such as carbon nano tube, and they will not be further described.

In an example, the vertical direction is regarded as the first direction, while the horizontal direction is regarded as the second direction. Thus, the vertical conductive strips are the first conductive strips, and the horizontal conductive strips are the second conductive strips. However, one with ordinary skill in the art can appreciate that the above is merely an example of the present invention, and the present invention is not limited to this. For example, the horizontal direction can be regarded as the first direction, while the vertical direction can be regarded as the second direction. In addition, the number of the first and the second conductive strips can be the same or different. For example, there may be N first conductive strips and M second conductive strips.

Figure 1D:
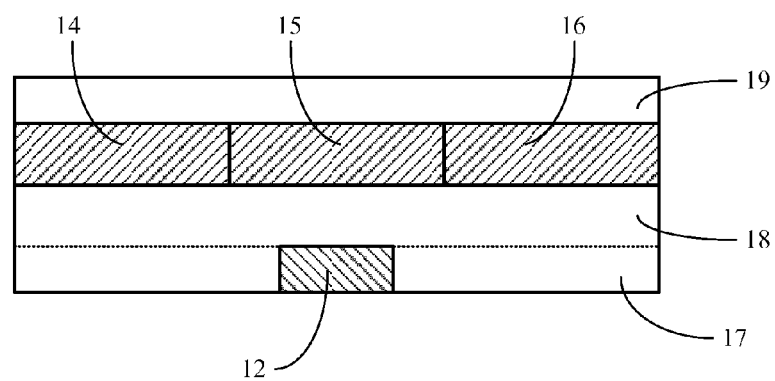
Figure 1E:
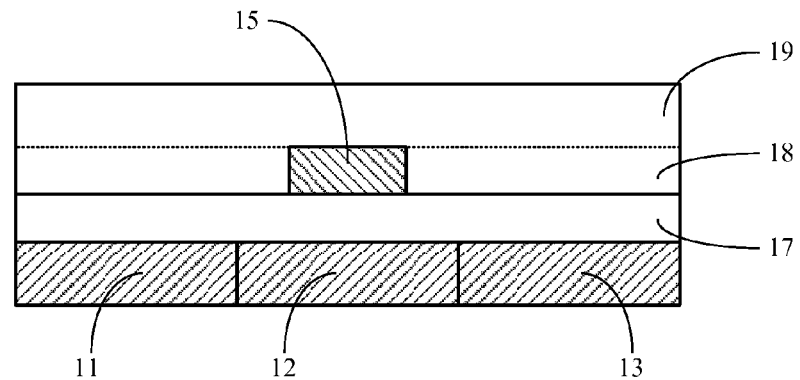

FIG. 1E is a cross-sectional diagram of FIG. 1C along a line I-I, which shows an insulating substrate 17, a portion of a second conductive strip (including a conductive pad 11, a second connecting line 12, and a conductive pad 13), an insulating layer 18, a portion of a first conductive strip (including a first connecting line 15), and an insulating surface layer 19. In an example of the present invention, the substrate 17, the insulating layer 18, and the insulating surface layer 19 can be made of transparent or opaque materials, such as glass or a plastic film. One with ordinary skill in the art can appreciate other constructions of the present example, and they will not be further described.

In an example of the present invention, FIG. 1D is a cross-sectional diagram of FIG. 1C along a line II-II, illustrating the structure of a DITO capacitive touch screen. It includes a substrate 17, a portion of a second conductive strip (including a second connecting line 12), an insulating layer 18, a portion of a first conductive strip (including a conductive pad 14, a first connecting line 15, and a conductive pad 16), and an insulating surface layer 19. In other words, in an example of the present invention, the capacitive touch screen includes an insulating surface layer, a first sensing layer of the first conductive strips, an insulating layer, and a second sensing layer of the second conductive strips. In another example of the present invention, the capacitive touch screen may be a rectangle having two opposite long sides and two opposite short sides, wherein the first conductive strips are arranged in parallel with the two opposite short sides, while the second conductive strips are arranged in parallel with the two opposite long sides.

Figure 1F:
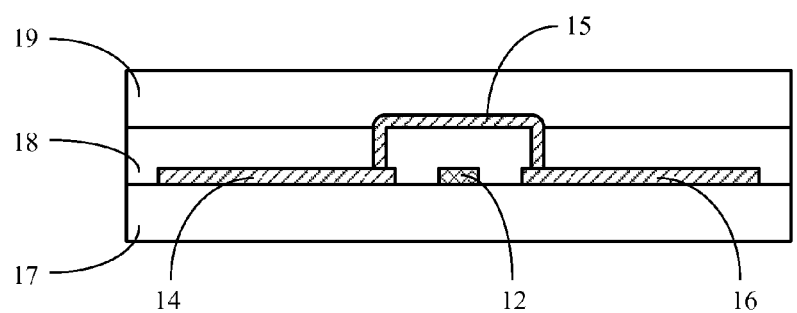

In an example of the present invention, FIG. 1F is a cross-sectional diagram of FIG. 1C along the line I-I, illustrating the structure of a SITO capacitive touch screen. It includes a substrate 17, a portion of a second conductive strip (including a second connecting line 12), an insulating layer 18, a portion of a first conductive strip (including a conductive pad 14, a first connecting line 15, and a conductive pad 16), and an insulating surface layer 19. The conductive pads 14 and 15 of the first conductive strip and the second connecting line 12 of the second conductive strip are co-planar, and the first connecting line 15 bridges over the second connecting line 12. The first connecting line 15 is isolated from the second connecting line 12 by the insulating layer 18. One with ordinary skill in the art can appreciate other types of bridging, for example, instead of the "over-bridge" structure as shown in the present example, an "under-bridge" structure can be formed.

Guarding or shielding conductive strips can also be interposed between the first and second conductive strips. The guarding conductive strips can increase the amount of change in the detected mutual capacitive signals and also reduce noises from external conductive objects as well as phantom (unreal) touches resulting from signals flowing from the capacitive touch screen to external conductive objects and back into the capacitive touch screen again. When the guarding conductive strips are interposed between the first and second conductive strips, and the guarding conductive strips are provided with a DC current or coupled to system ground, the guarding conductive strips can shield any capacitive coupling directly between the first and the second conductive strips, so that the amount of change in mutual capacitive signals that can be influenced by any external conductive object coupled to ground is increased.

Figure 2A:
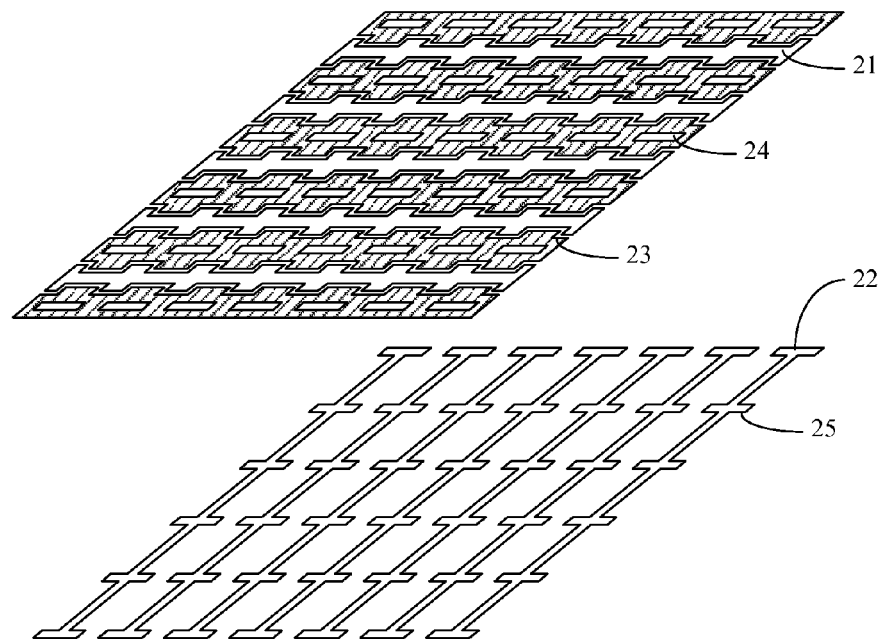
FIGS. 2A and 2B are schematic diagrams depicting a capacitive touch screen including guarding conductive strips.
Figure 2B:
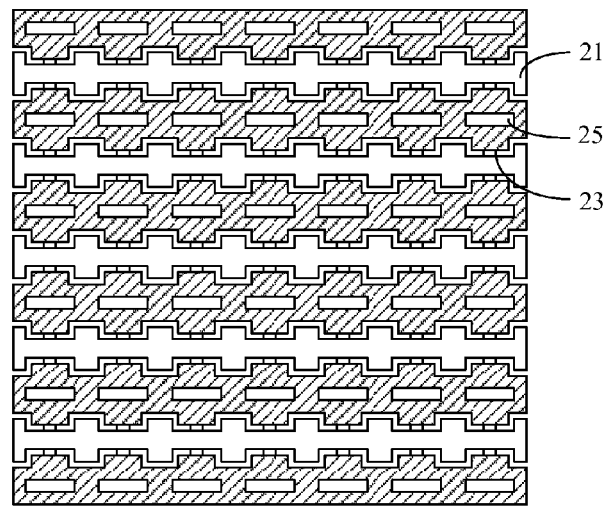

For example, as shown in FIGS. 2A and 2B, schematic diagrams depicting a capacitive touch screen including the guarding conductive strips are shown. Guarding conductive strips 21 and first conductive strips 23 intersect and exposed from each other, and each first conductive strip 23 includes a plurality of openings 24 for exposing conductive pads 25 of second conductive strips 22.

Figure 2C:
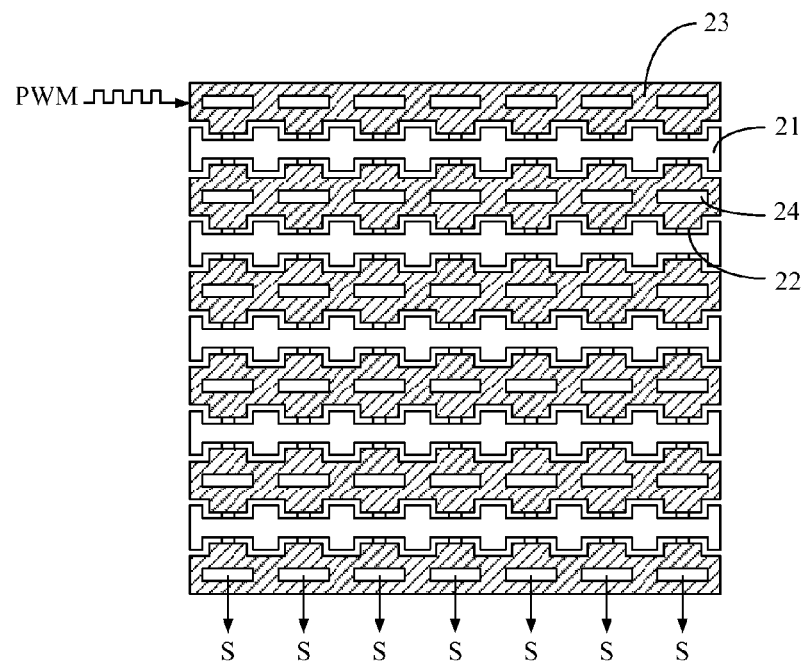
FIG. 2C is a schematic diagram illustrating a 2D mutual capacitive detection.

Referring now to FIG. 2C, in the process of two-dimension (2D) mutual capacitive detection, an alternating driving signal (e.g. a pulse width modulated (PWM) signal) is sequentially provided to each of the first conductive strips 23, and one-dimension (1D) sensing information of each conductive strip provided with the driving signal can be obtained via signals S of the second conductive strips 22. Sensing information corresponding to all of the first conductive strips 23 is then combined to construct 2D sensing information. The 1D sensing information can be generated by the signals of the second conductive strips 22, or based on differences between the signals of the second conductive strips 22 and some reference values. Furthermore, the sensing information can be generated based on current, voltage, capacitive coupling quantity, charge quantity, or other electrical characteristics of the signals, and can be in analog or digital form. In this example, the driving signal is provided in turn to one of the first conductive strips 23. One with ordinary skill in the art can appreciate that the driving signal can also be provided to two or more adjacent strips of the first conductive strips 23 at a time.

For example, in an example of the present invention, a driving signal is provided in turn to one of the first conductive strips, and when each of the first conductive strips is being provided with the driving signal, 1D sensing information of the first conductive strip being provided with the driving signal is obtained via signals generated by all of the second conductive strips. Sensing information corresponding to all of the first conductive strips is then combined to construct 2D sensing information. In another example of the present invention, a driving signal is sequentially provided to a pair of the first conductive strips, and when each pair of the first conductive strips is being provided with the driving signal simultaneously, 1D sensing information of the first conductive strips being provided with the driving signal is obtained via signals generated by all of the second conductive strips. Sensing information corresponding to each pair of the first conductive strips is then combined to construct 2D sensing information.

One with ordinary skill in the art can appreciate that the location of each external conductive object coupled to ground can be determined based on the 2D sensing information. For example, a range in which each external conductive object coupled to ground touches or approaches can be first determined by methods such as watershed algorithm, object connecting method, or other image segmentation methods. Then, the exact location is determined. For example, signal values of the range in which the external conductive object touches or approaches can be used to calculate the centroid position.

When there is no external conductive object actually approaching or touching the touch screen, or no touch or approach by external conductive objects is determined by the system, the position detecting device may generate reference values based on the signals of the second conductive strips. The sensing information can be generated based on the signals of the second conductive strips or by subtracting the reference values from the signals of the second conductive strips. In the former case, real or unreal touches can be determined by the differences between the sensing information and the reference values. In the latter case, which is a preferred example of the present invention, the sensing information itself is already the differences that can be used directly to determine real or unreal touches. The reference values can be obtained at the initial phase of the position detective device or repeatedly obtained in the operational phase of the position detecting device.

In the following descriptions, when an external conductive object approaches or covers the touch screen and causes a real touch, the part of the sensing information corresponding to the real touch is called real-touch sensing information. On the contrary, the part of the sensing information that exhibits opposite characteristics to the real-touch sensing information is called unreal-touch sensing information, which represents an unreal touch. The formation of real-touch sensing information is not necessarily entirely due to an approach or coverage on the touch screen by an external conductive object, but an approach or coverage on the touch screen by an external conductive object is merely one of the causes for a real touch. Said sensing information may include but not limited to 1D sensing information or 2D sensing information. Moreover, the formation of an unreal touch does not necessarily means the existence of an external conductive object or any substances at the corresponding location. Furthermore, real-touch sensing information may be one that conforms or is similar to the sensing information caused by a real touch, and not necessarily caused by an actual external conductive object approaching or covering the touch screen. For example, when 1D sensing information exhibits signal values of the conductive strips, real-touch sensing information may be positive values that first increase then decrease, or negative values that first decrease then increase; whereas unreal-touch sensing information is opposite to the real-touch sensing information. As another example, 1D sensing information exhibits differences between one conductive strip and another conductive strip, real-touch sensing information may be positive values that first increase then decrease plus negative values that first decrease then increase, that is, positive values followed by negative values; whereas unreal-touch sensing information is opposite to the real-touch sensing information.

When a conductive substance such as water is adhered to the insulating surface layer, sensing information may vary with the area of the adhered conductive substance. When the area in which the conductive substance adhered is smaller, the capacitive coupling between the conductive substance and the conductive strips may exhibit unreal-touch sensing information. However, when the area in which the conductive substance adhered is larger, the capacitive coupling between the conductive substance and the conductive strips may exhibit not only unreal-touch sensing information, but also real-touch sensing information. When water covers many regions, numerous real-touch sensing information and unreal-touch sensing information may be generated, causing misjudgment.

If the sensing information exhibits only unreal-touch sensing information but no real-touch sensing information, it can be determined that a conductive substance is adhered to the insulating surface layer. In addition, if the sensing information has unreal-touch sensing information as well as real-touch sensing information at the edge of the unreal-touch sensing information, it can also be determined that a conductive substance is adhered to the insulating surface layer. When it is determined that conductive substance is adhered to the insulating surface layer, the touch sensor may notify the system or a user of the fact that a conductive substance is adhered to the insulating surface layer, and wait for further actions to be taken. For example, the touch sensor may stop updating the reference values or not provide locations of any detected external conductive objects until the conductive substance is removed. However, the above circumstances are only limited to a small area in which the conductive substance is adhered.

Figure 2D:
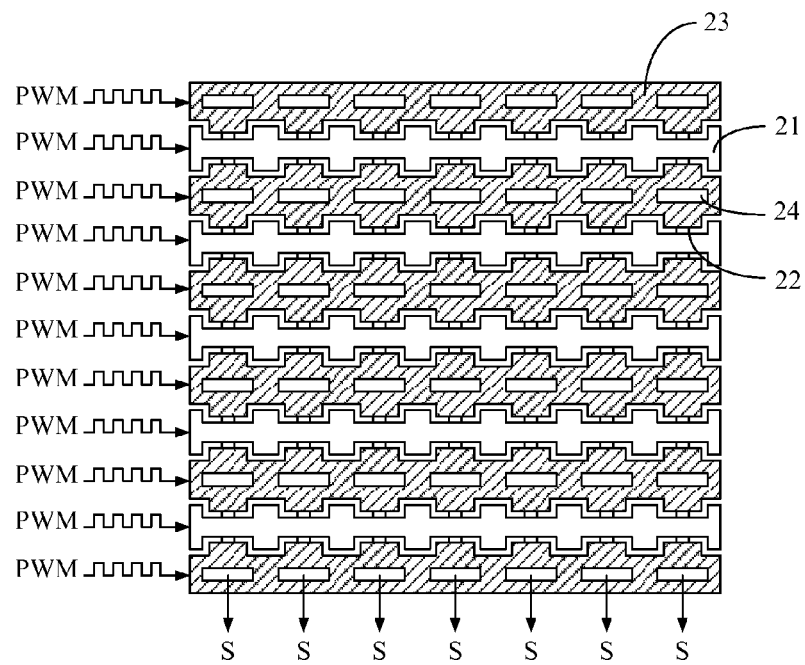
FIG. 2D is a schematic diagram illustrating a full screen driven detection.

Furthermore, the present invention proposes a one dimensional mutual capacitive detection with full screen driving (or simply referred to as full screen driven detection hereinafter). Referring to FIG. 2D, in a preferred example of the present invention, the position detecting device must have the ability to provide a driving signal to all of the first conductive strips simultaneously. In the following, providing a driving signal (e.g. a PWM signal) to all of the first conductive strips simultaneously is referred to as full screen driving. In each full screen driving, at least one 1D sensing information is produced based on signals of all or part of the conductive strips. As mentioned before, one dimensional mutual capacitive detection with full screen driving also has its reference values. In addition, when touch screen includes the guarding conductive strips 21, full screen driving further includes simultaneously driving all of the guarding conductive strips 21, i.e., simultaneously providing a driving signal to all of the first conductive strips 23 and the guarding conductive strips 21. In the following descriptions, during full screen driven detection, simultaneously providing a driving signal to all of the first conductive strips 23 also implies simultaneously providing a driving signal to all of the guarding conductive strips 21. If the touch screen includes the first conductive strips 23 and the second conductive strips 22, but not the guarding conductive strips, then full screen driving only includes simultaneously providing a driving signal to all of the first conductive strips.

If only a single conductive strip is provided with the driving signal, then the driving signal may cause unreal or real touch due to an attached conductive substance coupled to other conductive strips. When all of the first conductive strips in the full screen are provided with the driving signal simultaneously, then the potentials for each first conductive strip are the same, and the above problem will not occur.

Furthermore, when all of the first conductive strips in the full screen are provided with the driving signal simultaneously, an approach or coverage of an external conductive object will exhibit real-touch sensing information, which can be used to determine the approach or coverage of the external conductive object, the conductive strip approached or covered by the external conductive object, and/or a 1D coordinate for the approach or touch of the external conductive object.

For example, a driving signal is simultaneously provided to all of the first conductive strips, and when the driving signal is simultaneously provided to all of the first conductive strips, signals of all second conductive strips are detected, forming 1D sensing information constructed by the signals of all of the second conductive strips. When each value of the 1D sensing information represents the signal of one the second conductive strips, a threshold value can be used to determine if there is at least one value in the 1D sensing information that exceeds the threshold value. If so, then it indicates that at least one external conductive object coupled to ground is touching or approaching the touch screen.

In an example of the present invention, when the touch screen includes the above guarding conductive strips, and when a full screen driven detection is performed, the driving signal is simultaneously provided to the guarding conductive strips and the first conductive strips. When a 2D mutual capacitive detection is performed, and when a driving signal is provided, the guarding conductive strips are simultaneously provided with a DC current or coupled to system ground.

For example, a device for detecting a touch screen in accordance with the present invention includes: the touch screen including a plurality of first conductive strips, a plurality of second conductive strips, and a plurality of guarding conductive strips, wherein the first conductive strip, the second conductive strips, and the guarding conductive strips are exposed and separated from each other; a controller for performing a full screen driven detection, which includes: simultaneously providing a driving signal to all of the first conductive strips and all of the guarding conductive strips; when all of the first conductive strips and all of the guarding conductive strips are provided with the driving signal, detecting mutual capacitive signals of all of the second conductive strips to generate a one-dimensional (1D) sensing information based on the signals of all of the second conductive strips; and determining whether at least one external conductive object coupled to ground is touching or approaching the touch screen based on the 1D sensing information; and when the controller determining the touch screen is touched or approached by at least one external conductive object coupled to ground based on the 1D sensing information, performing a 2D mutual capacitive detection to obtain a 2D sensing information to determine a location of each external conductive object coupled to ground based on the 2D sensing information, wherein the 2D mutual capacitive detection includes: sequentially providing a driving signal to one or more different conductive strips in the first conductive strips, and providing a DC potential to all of the guarding conductive strips; each time one or more different conductive strips in the first conductive strips being provided with the driving signal, detecting the signals of all of the second conductive strips to obtain a 1D sensing information corresponding to the one or more first conductive strips being provided with the driving signal generated based on the mutual capacitive signals of all of the second conductive strips; and combining each 1D sensing information corresponding to the one or more first conductive strips being provided with the driving signal to generate a 2D sensing information.

In addition, the 1D sensing information can be generated by differential values or dual differential values. For example, when each value of the 1D sensing information represents the difference in signals of a pair of second conductive strips, it can be determined whether there is at least one zero-crossing between an adjacent positive value and an adjacent negative value in the 1D sensing information. If there is at least one zero-crossing, then it indicates that at least one external conductive object coupled to ground is touching or approaching the touch screen. The adjacent positive value and adjacent negative value means that there is no other value or only zero value(s) between that positive value and that negative value. Furthermore, in an example of the present invention, values falling within a predetermined zero-value range are regarded as zero values, wherein the zero-value range includes zero. Since capacitive touch screen detection is vulnerable to external noise interference, using a zero-value range can reduce misjudgment and simplify data. In an example of the present invention, assuming that the signals of the second conductive strips are $S_1, S_2 \ldots$ and $S_n$, respectively, and the 1D sensing information employs differential values, then the values of the 1D sensing information are $S_1-S_2, S_2-S_3 \ldots$ and $S_{n-1}-S_n$.

When each value of the 1D sensing information represents the difference between the signal differences of two pairs of the second conductive strips, a threshold value can be used to determine if there is at least one value in the 1D sensing information that exceeds the threshold value. If so, then it indicates that at least one external conductive object coupled to ground is touching or approaching the touch screen. Alternatively, it can be determined if there is at least one value between two zero-crossings that exceeds a threshold value. If so, then it indicates that at least one external conductive object coupled to ground is touching or approaching the touch screen. In an example of the present invention, assuming that the signals of the second conductive strips are $S_1, S_2 \ldots$ and $S_n$, respectively, and the 1D sensing information employs dual differential values, then the values of the 1D sensing information are $((S_2-S_3)-(S_1-S_2)), ((S_3-S_4)-(S_2-S_3)) \ldots$ and $((S_{n-1}-S_n)-(S_{n-2}-S_{n-1}))$. In a best mode of the present invention, the 1D sensing information employs dual differential values.

Simply put, in the previous examples, a value or a zero-crossing that exceeds a threshold value can be used to determine if there is at least one external conductive object coupled to ground touching or approaching the touch screen. One with ordinary skill in the art can appreciate that the 1D sensing information can take forms other than signal values, differential values or dual differential values. For example, each value can be the difference between two non-adjacent signal values; the present invention is not limited as such.

In a best mode of the present invention, the position detecting device must have the ability to simultaneously provide a driving signal to all of the first conductive strips and detect the second conductive strips. That is, during full screen driving, 1D sensing information is produced based on signals of the second conductive strips. The detection of the second conductive strips can be done by scanning conductive strips one after the other, scanning some of the conductive strips simultaneously, or scanning all of the conductive strips simultaneously to obtain the sensing information corresponding to all of the second conductive strips. In the following descriptions, this is referred to as full screen driven detection. In other words, full screen driven detection includes detecting the mutual capacitive signals of all sensed conductive strips (e.g. all second conductive strips) while all driven conductive strips (e.g. all first conductive strips) are being driven.

In order to achieve a satisfying resolution, the number of conductive strips increases with the increase of the size of the touch screen. However, pins used by the controller for simultaneously detecting the conductive strips cannot be necessarily increased accordingly. In 2D mutual capacitive detection, only conductive strips in a single axis need to be detected, such as the second conductive strips. Thus, by directly using the legacy architecture for detecting the second conductive strips, the position detecting device only needs to acquires the ability of full screen driving in order to perform full screen driven detection. In a preferred example of the present invention, the number of the second conductive strips is less than that of the first conductive strips.

In another example of the present invention, the position detecting device must have the ability to simultaneously provide a driving signal to all of the first conductive strips and detect all the conductive strips. That is, during full screen driving, first 1D sensing information is produced based on signals of the first conductive strips, and second 1D sensing information is produced based on signals of the second conductive strips. Compared to the previous example, the position detecting device must also have the ability to detect the first conductive strips.

In summary of the above, in full screen driven detection, if there is no approach or coverage of any external conductive object, regardless of the existence of any adhered conductive substances, no real touch will be determined, that is, the sensing information will not exhibit real-touch sensing information. In an example of the present invention, the full screen driven detection is used to determine whether there is a real touch or whether there is an approach or coverage by an external conductive object. In another example of the present invention, the full screen driven detection is used to determine the conductive strip(s) touched or covered by the external conductive object, which can be only the second conductive strip(s) covered or the first and second conductive strip(s) covered. In yet another example of the present invention, the full screen driven detection is used to determine coordinates, which can be a 1D coordinate based on 1D sensing information, or a first 1D coordinate and a second 1D coordinate (i.e. a 2D coordinate) based on the first 1D sensing information and second 1D sensing information, respectively.

The position detecting device may have the abilities of full screen driven detection and 2D mutual capacitive detection. For example, the driving signal can be provided simultaneously to all, some or just one of the first conductive strips, and 1D sensing information or 2D sensing information is detected from the second conductive strips.

Figure 2E:
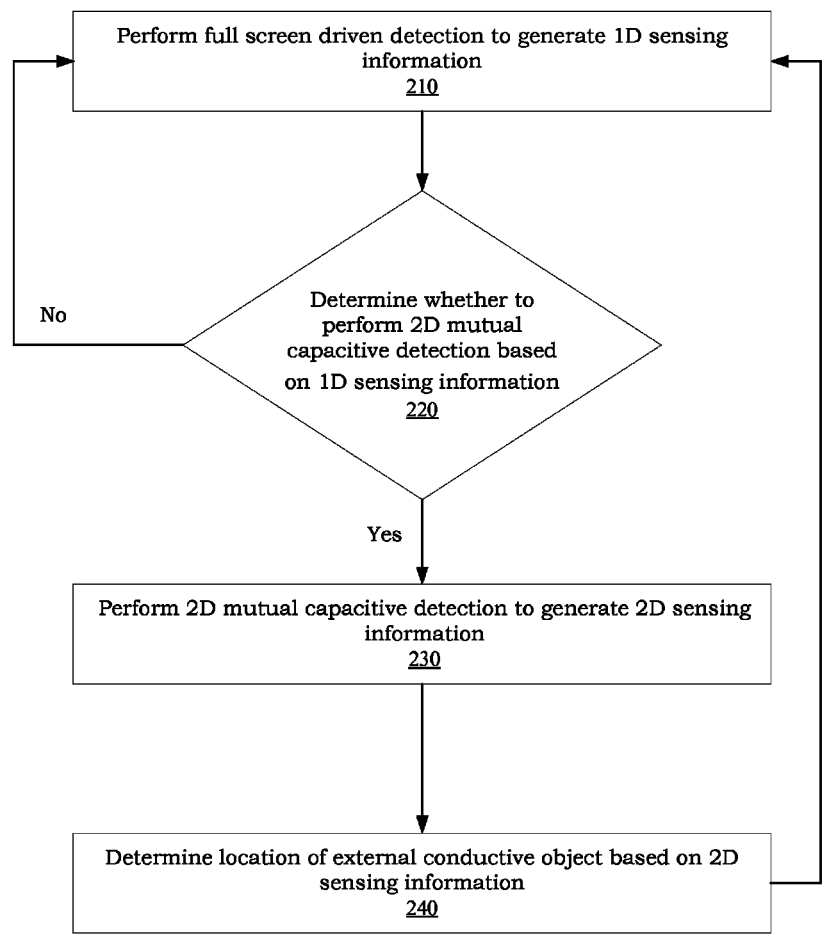
FIG. 2E is a flowchart illustrating performing a full screen driven detection before performing a 2D mutual capacitive detection proposed in accordance with a first embodiment of the present invention.

Referring to FIG. 2E, a flowchart illustrating a full screen driven detection is carried out followed by a 2D mutual capacitive detection according to a first embodiment of the present invention is shown. As shown in step 210, a full screen driven detection is carried out to generate 1D sensing information. Then, as shown in step 220, it is determined whether to perform a 2D mutual capacitive detection based on the 1D sensing information. For example, if the 1D sensing information determines an approach or coverage of an external conductive object, then as shown in step 230, a 2D mutual capacitive detection is carried out to generate 2D sensing information. Then, as shown in step 240, the location of the external conductive object is determined based on the 2D sensing information.

In step 220, if it is determined that there is no approach or coverage of any external conductive objects, then return to step 210 to repeat the full screen driven detection. In an example of the present invention, the period for performing full screen driven detections is fixed, that is, in a period of time in which a plurality of full screen driven detections are performed consecutively, an interval adjacent two full screen driven detections is a detection period. In any detection period, if it is determined that there is no approach or coverage of any external conductive objects, then power for performing only one full screen driven detection is consumed. Otherwise, power for performing one full screen driven detection and N times of 1D mutual capacitive detections (i.e. a 2D mutual capacitive detection) is consumed. Said detection period can be adjusted according to needs. For example, under a power saving mode, the duration of the detection period can be prolonged to save power. Under a normal mode, the duration of the detection period can be shortened to increase detection frequency, that is, increasing coordinates acquisition rate. In contrast, in another example of the present invention, the detection period is not fixed. For example, in step 220, if it is determined that there is no approach or coverage of any external conductive objects, then return to and repeat step 210. For example, under a normal mode, unless it is necessary to perform a 2D mutual capacitive detection, full screen driven detection is repeatedly performed. If it is necessary to perform a 2D mutual capacitive detection, then step 230 or steps 230 and 240 is/are performed and then step 210 is repeated.

Moreover, full screen driven detection is carried out based on a first detection frequency. After a predetermined period of time or a predetermined number of times has elapsed without any external conductive object approaching or touching the touch screen, then full screen driven detection is carried out based on a second detection frequency until approaching or coverage of an external conductive object is detected. Thereafter, full screen driven detection is again carried out based on the first detection frequency. For example, the driving signal is provided to all of the first conductive strips at a first frequency, and since that a predetermined period of time or a predetermined number of times has elapsed without detecting an approach or a touch by any external conductive object coupled to ground, then the driving signal is provided to all of the first conductive strips at a second frequency, wherein the first frequency is faster than the second frequency. Furthermore, when an approach or a touch of an external conductive object coupled to ground is detected while the driving signal is provided to all of the first conductive strips at the second frequency, the driving signal is then provided to all of the first conductive strips at the first frequency again.

Alternatively, after the 2D mutual capacitive detection has determined an approach or coverage of an external conductive object, the 2D mutual capacitive detection is continued, and steps 210 and 220 are skipped, meaning no full screen driven detection is performed, until the 2D mutual capacitive detection has not detected any approach or coverage of external conductive objects.

Accordingly, in an example of the present invention, when a driving signal is simultaneously provided to all of the first conductive strips, mutual capacitive signals of all of the second conductive strips are detected to generate 1D sensing information based on the signals of all of the second conductive strips, and it is determined whether a 2D mutual capacitive detection is to be performed by determining whether there is at least one external conductive object coupled to ground is approaching or touching the touch screen based on the 1D sensing information, wherein the 2D mutual capacitive detection is carried out by detecting the mutual capacitive signals of all of the second conductive strips while a portion of the first conductive strips are being provided with the driving signal.

Figure 3:
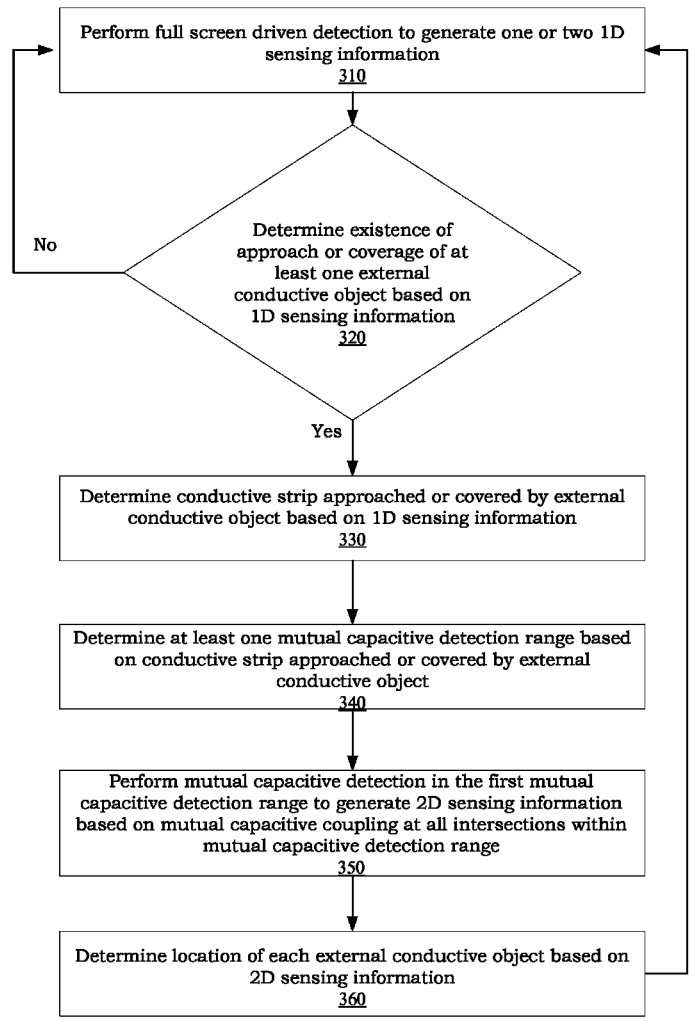
FIG. 3 is a flowchart illustrating determining locations based on results of a full screen driven detection and a 2D mutual capacitive detection proposed in accordance with a second embodiment of the present invention.

Referring to FIG. 3, a flowchart illustrating the determination of locations based on results of a full screen driven detection and a 2D mutual capacitive detection according to a second embodiment of the present invention is shown. As shown in step 310, a full screen driven detection is carried out to generate one or two 1D sensing information. For example, one 1D sensing information is generated based on the first conductive strips or the second conductive strips, or first 1D sensing information corresponding to the first conductive strips and second 1D sensing information corresponding to the second conductive strips are generated based on signals of the first conductive strips and the signals of the second conductive strips. Next, as shown in step 320, it is determined whether there is an approach or coverage of at least one external conductive object based on the 1D sensing information. If there is no approach or coverage of an external conductive object, then repeat step 310; else as shown in step 330, conductive strips approached or covered by the external conductive object are determined based on the 1D sensing information, and as shown in step 340, at least one mutual capacitive detection range is determined based on the conductive strips approached or covered by the external conductive object. Then, as shown in step 350, a mutual capacitive detection is performed in the mutual capacitive detection range to generate 2D sensing information based on mutual capacitive coupling at all intersections within the mutual capacitive detection range. For example, mutual capacitive coupling at intersections outside the mutual capacitive detection range is designated as a predetermined value (e.g. a zero value), in combination with values detected from the mutual capacitive coupling within the mutual capacitive detection range, 2D sensing information is generated. Thereafter, as shown in step 360, the location of each external conductive object is determined based on the 2D sensing information. Then, return to repeat step 310. The above 2D sensing information can also be a partial full screen image, which only shows the capacitive coupling within the mutual capacitive detection range, and from which the location of each external conductive object is further derived.

In an example of the present invention, 1D sensing information is generated based on the signals of the first conductive strips, and the mutual capacitive detection range is an area that includes all intersections of the first conductive strips approached or covered by the external conductive object. In other words, a driving signal is sequentially provided to the first conductive strips approached or covered by the external conductive object, and when each first conductive strip is provided with the driving signal, 2D sensing information is generated based on all of the second conductive strips. Compared to 2D full mutual capacitive detection, the present example saves a significant amount of time.

In another example of the present invention, 1D sensing information is generated based on the signals of the second conductive strips, and the mutual capacitive detection range is an area that includes all intersections of the second conductive strips that are approached or covered by the external conductive object. In other words, a driving signal is sequentially provided to the first conductive strips, and when each first conductive strip is provided with the driving signal, 2D sensing information is generated based on the second conductive strips approached or covered by the external conductive object. Compared to 2D full mutual capacitive detection, the present example ignores noise outside the mutual capacitive detection range.

In a preferred example of the present invention, first 1D sensing information and second 1D sensing information are generated based on the signals of the first and second conductive strips, respectively, and the mutual capacitive detection range is an area that includes all intersections of the first conductive strips and the second conductive strips that are approached or covered by the external conductive object. In other words, a driving signal is sequentially provided to the first conductive strips approached or covered by the external conductive object, and when each first conductive strip is provided with the driving signal, 2D sensing information is generated based on the second conductive strips approached or covered by the external conductive object. Compared to 2D full mutual capacitive detection, the present example saves a significant amount of time and ignores noise outside the mutual capacitive detection range.

In addition, in an example of the present invention, it can be determined whether there is an approach or coverage of at least one external conductive object on the touch screen based on the first 1D sensing information. This includes: determining a 1D coordinate of each external conductive object coupled to ground based on the first 1D sensing information; detecting signals of all of the second conductive strips to obtain a second 1D sensing information generated from the signals of all of the second conductive strips; determining a second 1D coordinate of each external conductive object coupled to ground based on the second 1D sensing information; forming a 2D coordinate from each 1D coordinate and a corresponding second 1D coordinate; using an intersection of a first conductive strip and a second conductive strip closest to each 2D coordinate as a corresponding detected intersection; and performing mutual capacitive detection at the detected intersection corresponding to each 2D coordinate to detect a mutual capacitive signal at the intersection corresponding to each 2D coordinate in order to determine a 2D coordinate for each external conductive object coupled to ground.

The mutual capacitive detection for any detected intersection may include providing a driving signal to at least one first conductive strip including the one intersected at the detected intersection, and detecting a signal of the second conductive strip intersected at the detected intersection, so as to detect a mutual capacitive signal at each intersection, wherein intersections on the same first conductive strip can be simultaneously detected while the driving signal is provided to at least one first conductive strip including the one intersected at the detected intersection, wherein the signal of the 2D coordinate of an external conductive object coupled to ground exceeds a threshold.

In another example of the present invention, it can be determined if there is an external conductive object coupled to ground approaching or touch the touch screen based on the first 1D sensing information and/or the second 1D sensing information. This includes: determining a mutual capacitive detection range based on the first 1D sensing information or based on the first 1D sensing information and the second 1D sensing information; performing mutual capacitive detection in this mutual capacitive detection range to generate a 2D sensing information based on mutual capacitive signals at the intersections of all of the first and second conductive strips in the mutual capacitive detection range; and determining the location of each external conductive object coupled to ground based on the 2D sensing information.

The above mutual capacitive detection range can be determined by all intersections of the first and the second conductive strips on the first conductive strips touched or approached by any external conductive object coupled to ground or determined by all intersections of the first and the second conductive strips touched or approached by any external conductive object coupled to ground determined based on the first 1D sensing information or based on the first 1D sensing information and the second 1D sensing information.

Figure 4A:
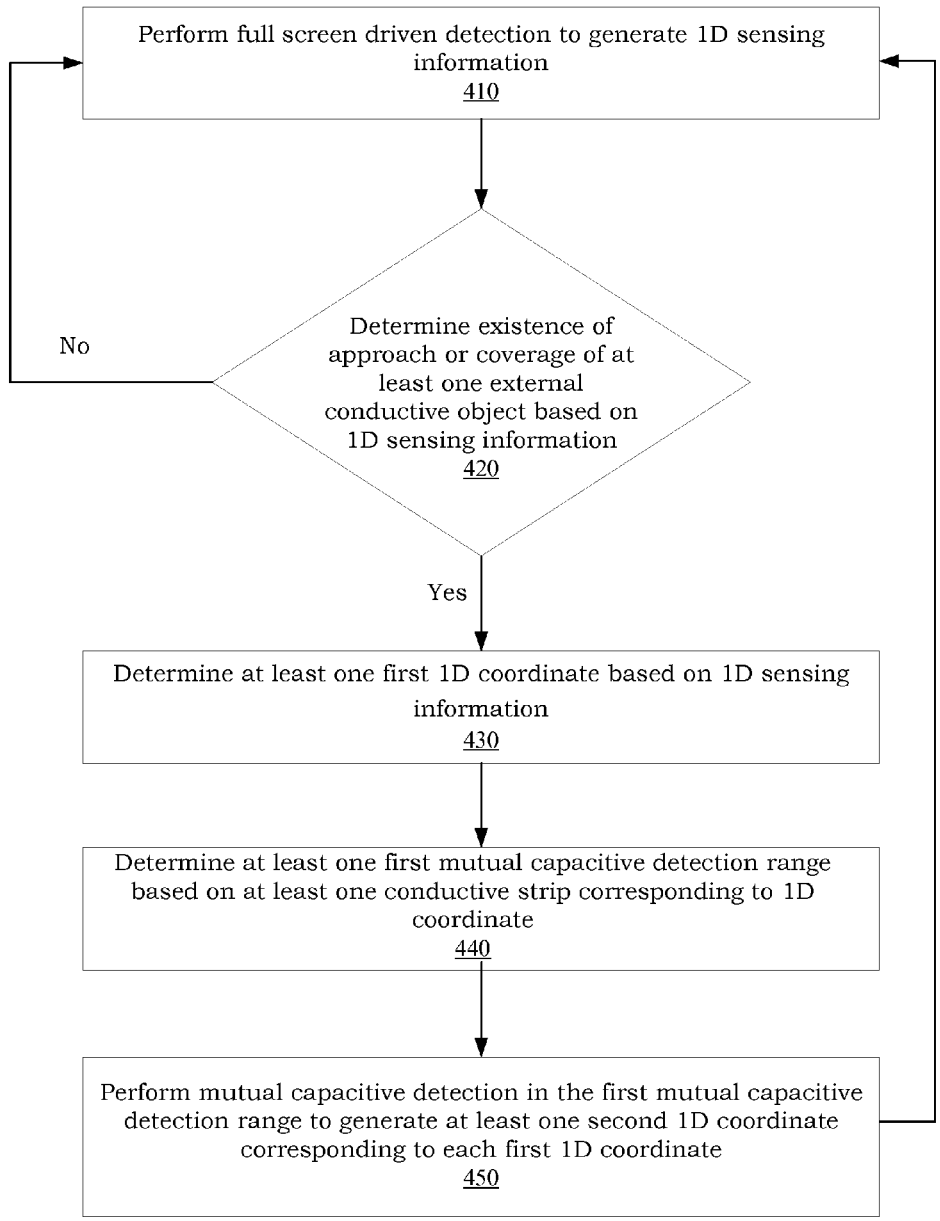
FIG. 4A to 4C are flowcharts illustrating determining locations based on results of a full screen driven detection and a mutual capacitive detection in accordance with a third embodiment of the present invention.

Referring to FIG. 4A, a flowchart illustrating the determination of locations based on results of a full screen driven detection and a mutual capacitive detection according to a third embodiment of the present invention is shown. As shown in step 410, a full screen driven detection is carried out to generate one 1D sensing information. Next, as shown in step 420, it is determined whether there is an approach or coverage of at least one external conductive object based on the 1D sensing information. If there is no approach or coverage of an external conductive object, then repeat step 410; else as shown in step 430, at least a first 1D coordinate is determined based on the 1D sensing information. Then, as shown in step 440, at least a first mutual capacitive detection range is determined based on at least one conductive strip corresponding to the first 1D coordinate. Then, as shown in step 450, a mutual capacitive detection is performed in the first mutual capacitive detection range to determine at least a second 1D coordinate corresponding to each first 1D coordinate. For example, two first 1D coordinates are determined in step 430, and in step 440, two mutual capacitive detection ranges are determined based on two conductive strips closet to the two first 1D coordinates, and in step 450, a mutual capacitive detection is performed to generate 1D sensing information corresponding to each of the first 1D coordinates, and at least a second 1D coordinate is determined corresponding to each of the first 1D coordinates. The first 1D coordinate and the second 1D coordinate can form a 2D coordinate, for example, (first 1D coordinate, second 1D coordinate) or (second 1D coordinate, first 1D coordinate).

For example, while the driving signal is provided to the first conductive strips, all of the second conductive strips are detected to obtain a first 1D sensing information generated based on the signals of all of the second conductive strips. In addition, determining whether there is an external conductive object coupled to ground touch or approaching the touch screen based on 1D sensing information can further include: determining at least a first 1D coordinate based on the first 1D sensing information; determining a first mutual capacitive detection range based on each first 1D coordinate, and performing mutual capacitive detection in the first mutual capacitive detection range to generate a second 1D sensing information corresponding to each first 1D coordinate; generating at least a second 1D coordinate corresponding to each first 1D coordinate based on the second 1D sensing information of each first 1D coordinate; and generating a 2D coordinate based on each first 1D coordinate and each corresponding second 1D coordinate.

Figure 4B:
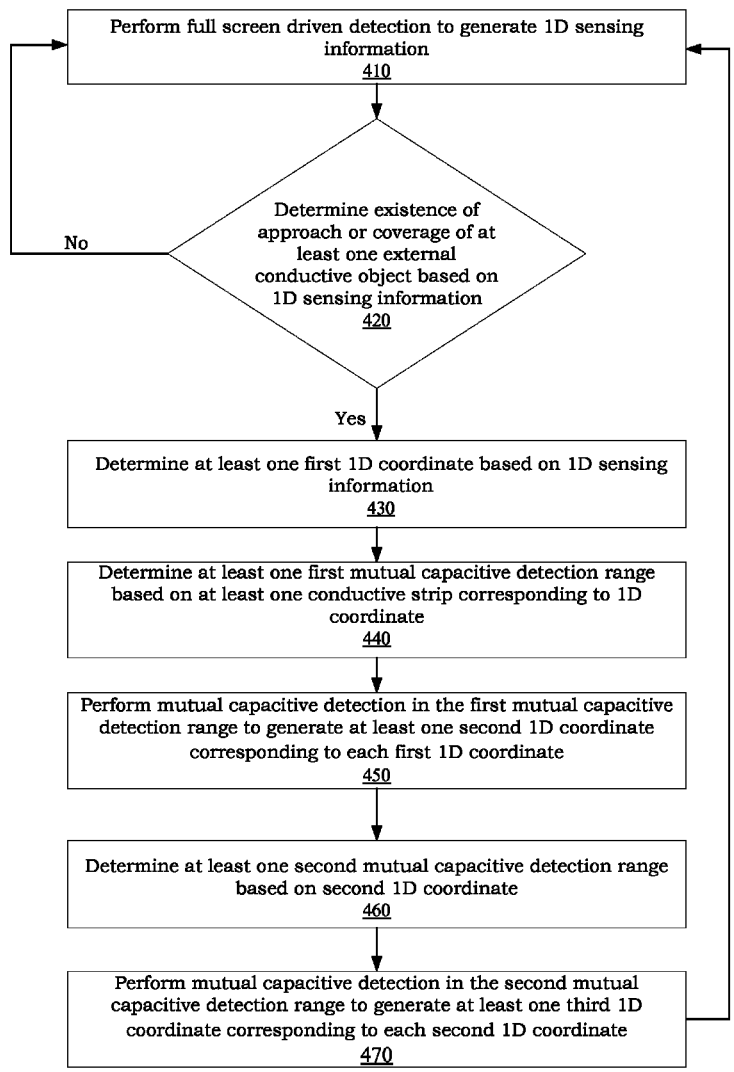

Referring to FIG. 4B, a step 460 is further included, in which at least a second mutual capacitive detection range is determined based on the second 1D coordinate, and a step 470 is further included, in which a mutual capacitive detection is performed in the second mutual capacitive detection range to determine a third 1D coordinate corresponding to each second 1D coordinate. The second 1D coordinate and the third 1D coordinate can form a 2D coordinate, for example, (third 1D coordinate, second 1D coordinate) or (second 1D coordinate, third 1D coordinate).

For example, while the driving signal is provided to the first conductive strips, all of the second conductive strips are detected to obtain a first 1D sensing information generated based on the signals of all of the second conductive strips. In addition, determining whether there is an external conductive object coupled to ground touch or approaching the touch screen based on 1D sensing information can further include: determining at least a first 1D coordinate based on the first 1D sensing information; determining a first mutual capacitive detection range based on each first 1D coordinate, and performing mutual capacitive detection in the first mutual capacitive detection range to generate a second 1D sensing information corresponding to each first 1D coordinate; generating at least a second 1D coordinate corresponding to each first 1D coordinate based on the second 1D sensing information of each first 1D coordinate; determining a second mutual capacitive detection range based on each second 1D coordinate, and performing mutual capacitive detection in the second mutual capacitive detection range to generate a third 1D sensing information corresponding to each second 1D coordinate; generating at least a third 1D coordinate corresponding to each second 1D coordinate based on the third 1D sensing information of each second 1D coordinate; and generating a 2D coordinate based on each second 1D coordinate and each corresponding third 1D coordinate.

In FIG. 4A, each first 1D coordinate matching each corresponding second 1D coordinate represent the location of an external conductive objects. In addition, when the external conductive object is determined, return to repeat step 410. In FIG. 4B, each second 1D coordinate matching each corresponding third 1D coordinate represent the location of an external conductive object. In addition, when the external conductive object is determined, return to repeat step 410.

Figure 4C:
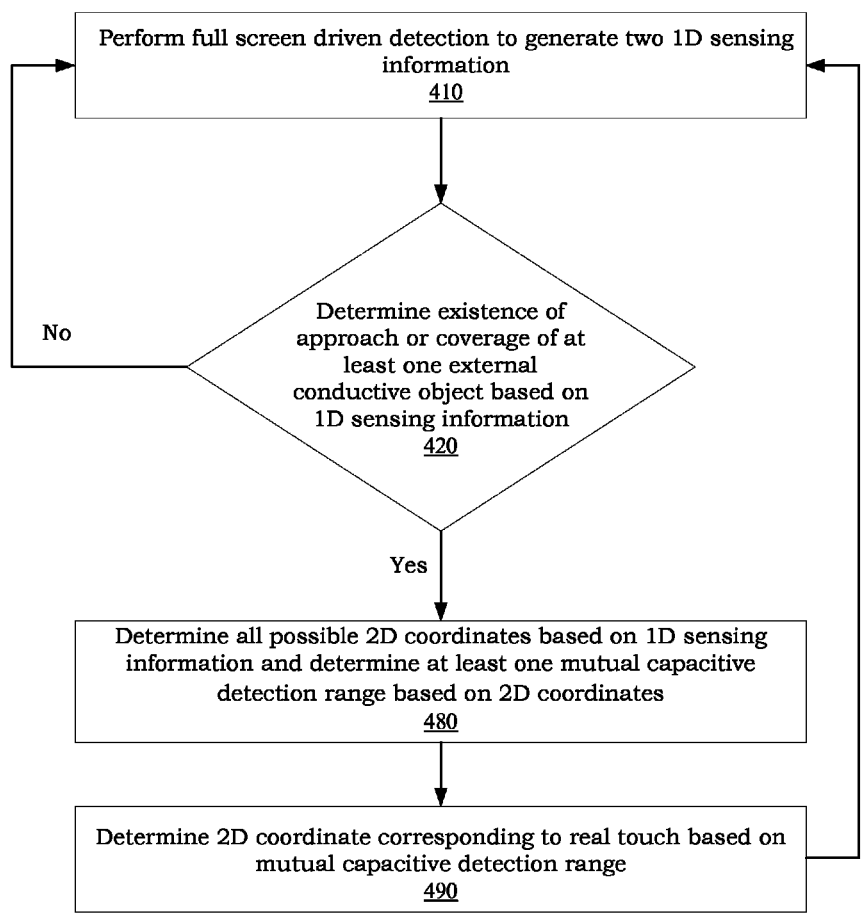

Referring to FIG. 4C, a flowchart illustrating the determination of locations based on results of a full screen driven detection and a mutual capacitive detection according to a third embodiment of the present invention is shown. As shown in step 410, a full screen driven detection is carried out to generate two 1D sensing information. Next, as shown in step 420, it is determined whether there is an approach or coverage of at least one external conductive object based on the 1D sensing information. If there is no approach or coverage of an external conductive object, then repeat step 410; else as shown in step 480, every possible 2D coordinate is determined based on the 1D sensing information, and at least a mutual capacitive detection range is determined based on the 2D coordinate. Then, as shown in step 490, a 2D coordinate corresponding to a real touch is determined based on the mutual capacitive detection range.

It is apparent that with the above full screen driven detection technique, an approach or touch of an external conductive object coupled to external ground can be successfully determined regardless of whether there is any water stain or other conductive objective that is not coupled to ground. Furthermore, when an approach or touch of an external conductive object coupled to external ground is detected, through the 2D mutual capacitive detection, the range to which a water stain or other conductive object not coupled to external ground adheres other than the range in which an external conductive object coupled to ground touches or approaches can be determined. When the range to which a water stain or other conductive object not coupled to external ground adheres is determined, no coordinate of this detected range to which the water stain or other conductive object not coupled to external ground adheres can be provided, or a message or signal for cleaning of the touch screen surface can be displayed, indicating the interference of any water stain or other conductive object not coupled to ground is eliminated.

In another example of the present invention the 2D mutual capacitive detection is performed before the full screen driven detection is performed. The full screen driven detection can determine an conductive strip touched or approached by an external conductive object coupled to external ground, and when compared with the 2D sensing information generated from the 2D mutual capacitive detection, the range to which a water stain or other conductive object not coupled to external ground adheres other than the range in which an external conductive object coupled to ground touches or approaches can be determined.

During system operation, the influence and interference of the external environment on the touch screen may constantly be varying, and in order to adept to such variations, the reference values can be updated periodically or non-periodically. Thus, update of the reference values can be performed continuously, or during the processes of full screen driven detection and/or mutual capacitive detection.

During mutual capacitive detection, if there is a conductive substance adhered to the touch screen, the 2D sensing information will exhibit a corresponding unreal touch or an unreal touch surrounded by a real touch. At this time, if the reference values are updated, then they will include the unreal touch. Before the next update of the reference values, as long as the external conductive object is not at the area where the unreal touch is, determination of the locations of external conductive object can be made correctly. However, if the conductive substance is removed, then the area that exhibits the unreal touch in the original reference will cause a real touch to be determined in the 2D sensing information, leading to a misjudgment.

By comparing with 1D sensing information generated in the above full screen driven detection, non-matching real touches exist between the 2D sensing information and the 1D sensing information, which reflects the above problem, and update of the reference values for mutual capacitive detection is performed to resolve the problem. For example, the 2D sensing information is 1D projected to generate 1D sensing information, or values corresponding to intersections on each second conductive strip are summed up to generate 1D sensing information. The 1D sensing information derived from the 2D sensing information is used for comparison with the 1D sensing information produced in full screen driven detection, so as to determine any non-matching real touches and whether update of the reference values for mutual capacitive detection should be performed in advance.

In addition, it is possible to determine whether a conductive substance is adhered to the touch screen solely by 2D full mutual capacitive detection. For example, in the case that 2D sensing information exhibits only unreal touch but no real touch or exhibits real touch that only appears in proximity to the unreal touch and no real touch that exceeds a certain threshold, then it can be determined that a conductive substance may be adhered to the touch screen. In an example of the present invention, one can presume that a conductive substance is attached to the touch screen. In another example of the present invention, another full screen driven detection can be carried out to ascertain if there is an approach or coverage by an external conductive object.

In an example of the present invention, update of the reference values is made when there is no approach or coverage of the touch screen made by any external conductive object. For example, as mentioned before, a full screen driven detection is firstly used to determine if there is an external conductive object approaching or covering the touch screen. When there is no approach or coverage of the touch screen made by any external conductive object, update of the reference values is made, which may include the reference update for the full screen driven detection and/or the mutual capacitive detection. As another example, the 2D sensing information generated by the 2D full mutual capacitive detection is used to determine if there is an external conductive object approaching or covering the touch screen. When there is no approach or coverage of the touch screen made by any external conductive object, update of the reference values is made.

Figure 5A:
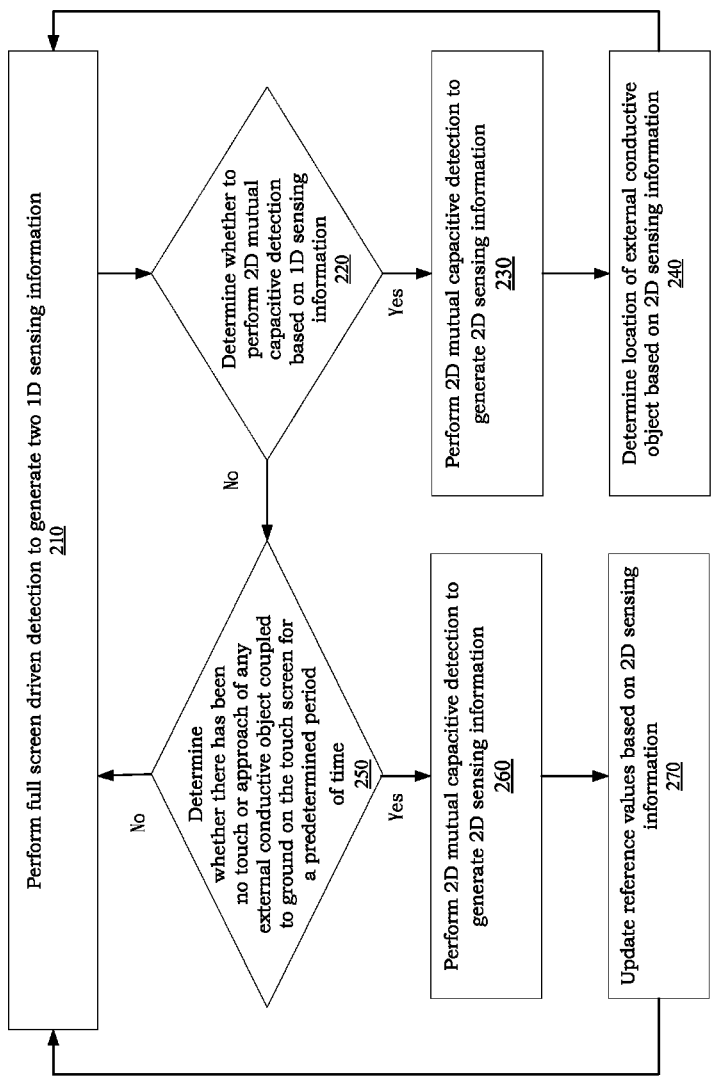
FIG. 5A is a flowchart illustrating a way of updating reference values proposed in accordance with a fourth embodiment of the present invention.

Referring to FIG. 5A, a flowchart illustrating a way of updating reference values proposed in accordance with a fourth embodiment of the present invention is shown. Compared with FIG. 2E, the method further includes, as shown in step 250, determining whether there has been no touch or approach of any external conductive object coupled to ground on the touch screen for a predetermined period of time based on the 1D sensing information. If not, then as shown in step 210, full screen driven detection is performed. Otherwise, if it is determined that there has been no touch or approach of any external conductive object coupled to ground on the touch screen for a predetermined period of time based on the 1D sensing information, then as shown in steps 260 and 270, a 2D mutual capacitive detection is performed obtain a 2D sensing information, and reference values are updated based on the 2D sensing information. The steps of updating a reference in FIG. 5A can be carried out by the above controller 160. In an example of the present invention, updating the reference values based on the 2D sensing information includes using the 2D sensing information as the new reference values or using an average of the 2D sensing information and the original reference values as the new reference values. Moreover, the location of each external conductive object coupled to ground is determined from the amount of change between mutual capacitive signals of the 2D sensing information and the reference values.

For example, a device for detecting a touch screen in accordance with the present invention includes: the touch screen including a plurality of first conductive strips and a plurality of second conductive strips; and a controller for performing a full screen driven detection, which includes: simultaneously providing a driving signal to all of the first conductive strips; when all of the first conductive strips are provided with the driving signal, detecting mutual capacitive signals of all of the second conductive strips to generate a one-dimensional (1D) sensing information based on the signals of all of the second conductive strips; and determining whether at least one external conductive object coupled to ground is touching or approaching the touch screen based on the 1D sensing information; and when the controller determining the touch screen is not touched or approached by any external conductive object over a predetermined period of time based on the 1D sensing information, performing a 2D mutual capacitive detection to obtain a 2D sensing information to update reference values based on the 2D sensing information, wherein the 2D mutual capacitive detection includes: sequentially providing a driving signal to one or more different conductive strips in the first conductive strips, and providing a DC potential to all of the guarding conductive strips; each time one or more different conductive strips in the first conductive strips being provided with the driving signal, detecting the signals of all of the second conductive strips to obtain a 1D sensing information corresponding to the one or more first conductive strips being provided with the driving signal generated based on the mutual capacitive signals of all of the second conductive strips; and combining each 1D sensing information corresponding to the one or more first conductive strips being provided with the driving signal to generate a 2D sensing information.

When determining the touch screen is touched or approached by at least one external conductive object coupled to ground based on the 1D sensing information, a 2D mutual capacitive detection is performed to obtain a 2D sensing information, and the location of each external conductive object coupled to ground is determined based on the 2D sensing information.

In the case that the touch screen is provided in a handheld device, it is likely that a hand holding the handheld device is approaching or covering the touch screen while turning on the device. If reference update is performed at this moment, then the initial reference values will include real-touch sensing information, such that the area in which the real-touch sensing information resides in the reference values cannot correctly reflect an approach or coverage by an external conductive object. Even if the hand (or finger) causing the real-touch sensing information later moves away from the touch screen, it may still prevent this area from reflecting an approach or coverage by an external conductive object, e.g. the location of an external conductive object approaching or covering this area cannot be determined correctly.

Figure 5B:
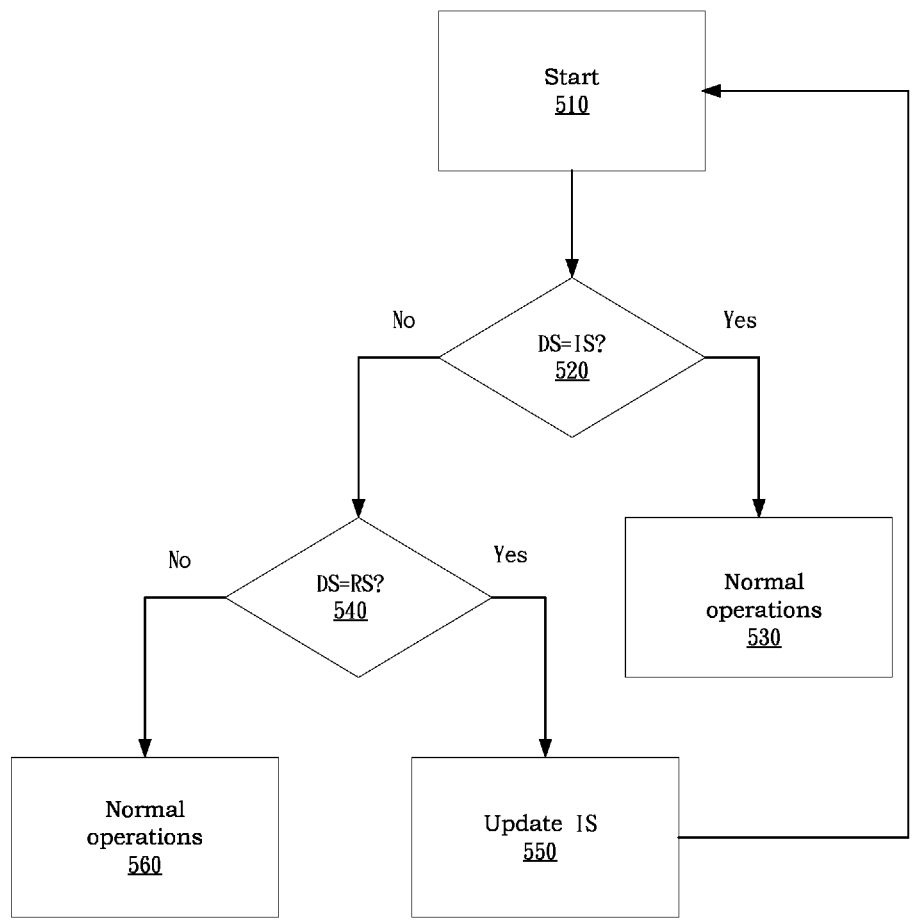
FIG. 5B is a flowchart illustrating a way of updating reference values according to a fifth embodiment of the present invention.

Referring to FIG. 5B, a flowchart illustrating a way of updating the reference values according to a fifth embodiment of the present invention is shown. The present invention proposes pre-storing original reference values. The original reference values can be stored in a non-volatile storage unit that retains data even if power is off. First, as shown in steps 510 and 520, the original reference values DS are compared with obtained reference values IS to see if they match each other. If yes, then as shown in step 530, normal operations are performed; else as shown in step 540, the original reference values are compared with obtained sensing information (1D sensing information or 2D sensing information) to see if they match each other, if not, then as shown in step 560, normal operations are performed; else as shown in step 550, the reference values are updated.

Under normal circumstances, the reference values are updated when there is no external conductive object approaching or covering the touch screen or no conductive substance attached to the touch screen, so normal reference values (including the original reference values DS) obtained should not exhibit any real or unreal touches. Assuming the original reference values DS are normal, and there is an external conductive object approaching or covering when the reference values IS are updated, afterwards when the sensing information RS is obtained, the original reference values DS are compared with the reference values IS, at this time they won't match. Thus, the sensing information RS is compared with the reference values DS, if they match, then it means there is no external conductive object approaching or covering the temperature or no conductive substance attached to the touch screen, so update of the reference values IS can be performed immediately. If they do not match each other, update of the reference values IS is not permitted, and normal operations are performed. For example, when a hand presses against the touch screen during power-on of the device, not only the reference values exhibit a real touch, the subsequent sensing information RS also exhibits a real touch. These two are the same, so even if the hand presses against the touch screen, no approach or coverage by an external conductive object is determined, thus ignoring the existence of the portion pressed by the hand while the device is being turned on. However, other parts of the touch screen may still operate normally. Once this hand moves away, if other portions have no approaching or touching external conductive object, in step 540, it is determined that the sensing information RS and the original reference values DS match each other, so update of the reference values can be made. If in step 540, other portions still have approaching or touching external conductive objects, then normal operations are performed, and update of the reference values IS is made when there is no approach or coverage made by any external conductive objects. In addition, if the original reference values are not normal, then the sensing information RS and the original reference values DS will not match each other, so normal operations are performed as shown in step 560.

The above reference values are applicable to self capacitive detection, mutual capacitive detection or full screen driven detection.

Moreover, the update of the reference values may be an update of a portion or all of the reference values. As described earlier, self capacitive detection and full screen driven detection generate 1D sensing information. When this is used as the reference values, then the update of the reference values means an update of all the reference values. During mutual capacitive detection, 2D sensing information is a collection of 1D sensing information corresponding to each first conductive strip (the first conductive strip provided with a driving signal), so the update of the reference values may be an partial reference update for a just one of the first conductive strips, in other words, an update of only one of a plurality of 1D sensing information in the reference values.

The touch screen of the present invention can be used for transmitting and receiving information, that is, the touch screen can be used for capacitive communication. With the controller providing a driving signal to one, some or all of the first conductive strips on the touch screen, signals can be transmitted. With the controller detecting one, some or all of the second conductive strips, signals can be received, so two touch screens may carry out one-way or two-way communications.

In an example of the present invention, touch screens can communicate with each other face to face, that is, touch screens carry out capacitive communication face to face with insulating surface layers therebetween. For example, touch screens may perform capacitive communication through human body. For example, one hand of a user touches the touch screen of a handheld device, while the other hand touches the touch screen of another handheld device, using the human body is a conductive medium for capacitive communication. As another example, a first user and a second user touch the touch screens of a first and a second handheld device, respectively. When the first user and the second user have body contact, the touch screens of the first and second handheld devices may then perform capacitive communication. One with ordinary skill in the art can appreciate that capacitive communication is not limited to one-to-one communication, but may be many-to-many communication, and the conductive medium is not limited to human body, but may be other conductive media. For example, two touch screens can reside in pockets of two different people. When these people shake hands or make contact with each other, these two touch screens can carry out communication.

Accordingly, a method for communication through touch screens is proposed by the present invention, which uses a first touch screen and a second touch screen for communication. The first and second touch screens have a detecting mode for detecting an approach or a touch of an external conductive object. In addition, the first and second touch screens further have a communication mode for communicating through capacitive coupling between the first and second touch screens in order to exchange or communicate a message. Therefore, a communication system is formed by the first and second touch screens. In an example of the present invention, the detecting and the communication modes can be executed in turns. In another example of the present invention, a user interface can be employed to switch between the detecting and the communication modes.

Figure 6:
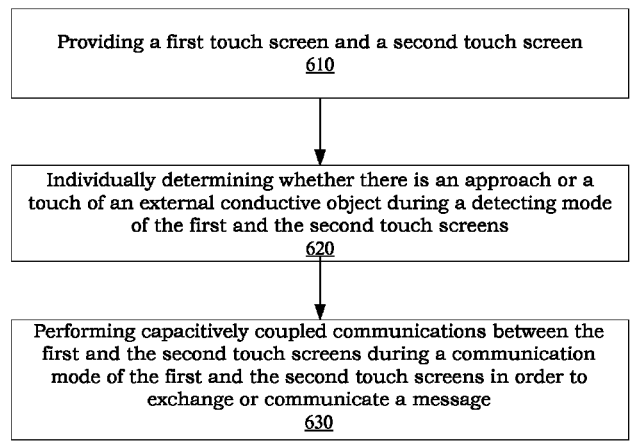
FIG. 6 is a flowchart illustrating a method for communication through touch screens according to a sixth embodiment of the present invention.

Referring to FIG. 6, a flowchart illustrating a method for communication through touch screens according to a sixth embodiment of the present invention is shown. As shown in step 610, a first touch screen and a second touch screen are provided. Then, in steps 620 and 630, whether there is an approach or a touch of an external conductive object is individually determined during a detecting mode of the first and the second touch screens, and capacitively coupled communication between the first and the second touch screens are performed during a communication mode of the first and the second touch screens in order to exchange or communicate a message.

For example, the first touch screen has a transparent insulating layer and a conductive layer. The message is transmitted by capacitive coupling from the conductive layer to the second touch screen with the transparent insulating layer disposed in between. On the other hand, the second touch screen also has a transparent insulating layer and a conductive layer. The message is transmitted by capacitive coupling from its conductive layer to the first touch screen with the transparent insulating layer disposed in between. The capacitive coupling between the first and the second touch screens can be a capacitive coupling between the first touch screen and the second touch screen through a capacitive coupling between the first touch screen and at least an external conductive object. For example, the first and the second touch screens both have a plurality of first conductive strips that will be provided with a driving signal during the detecting mode and a plurality of second conductive strips that will provide capacitive signals as a result of the driving signal. In the communication mode, the first and the second touch screens may communicate with each other by a first conductive strip and/or a second conductive strip touched or approached by an external conductive object.

Signals can be transmitted in analog or digital form. In a preferred example of the present invention, signals are sent in the form of digital encoding. For example, they can be in the form of binary strings or packets. The number of bits for a single transmission may be fixed or variable, such as a balanced code or Berger code with a fixed length. Signals may also be in the form of packets with packet headers. Capacitive communication may employ handshaking mechanism as a transmission requirement by a touch screen at the transmitter end sending encoded signals or packets, so that a touch screen at the receiver end may acknowledge by returning a signal or packet in response to a successful reception of the transmission, thereafter the touch screen at the transmitter end may start transmitting data to the receiver end.

When two touch screens face each other in close proximity or touch each other, one touch screen may know of the existence of the other touch screen by providing a driving signal to conductive strips and detecting signals from conductive strips, and may then perform capacitive communication. In an example of the present invention, a first touch screen may provide the driving signal, and if a second touch screen touches the first touch screen or is within a predetermined range, signals of conductive strips of the first touch screen will be smaller than signals of the conductive strips of the first touch screen when the second touch screen is not touching or within the predetermine distance, thereby confirming whether capacitive communication can be carried out. At the same time, conductive strips of the second touch screen will also be affected by the capacitive coupling of the driving signal of the first touch screen, so confirmation of whether capacitive communication is allowed can also be made by detecting the conductive strips of the second touch screen.

In an example of the present invention, the controller that performs capacitive communication has the ability of identifying the conductive strips that are receiving signals. For example, when a first or a first group of transmitting conductive strip(s) of the first touch screen is/are driven by driving signal(s), a first or a first group of receiving conductive strip(s) of the second touch screen is/are capacitively coupled. When the controller of the second touch screen detects signals of the various conductive strips, it may identify the conductive strips that are capacitively coupled. In this case, the second touch screen may select one or some conductive strips as a second or a second group of transmitting conductive strip(s) except for the identified first or first group of receiving conductive strip(s), and provide a driving signal thereto. Similarly, the first touch screen may identify a second or a second group of receiving conductive strip(s) that are capacitive coupled with the driving signal provided by the second touch screen. In other words, the capacitive communications performed by the touch screens of the present invention can be simplex or full duplex. Since the touch screens may not exactly aligned with each other when placed face-to-face, and the size or the number of conductive strips of the first and second touch screens may not be the same, the capacitive communications performed by the touch screens of the present invention are applicable to touch screens that are not aligned or with different sizes or different number of conductive strips.

The types of communications of the touch screens in the present invention may include, but not limited to, simplex, half duplex or full duplex. The capacitive coupling between the first and the second touch screens is a direct capacitive coupling between the first and the second touch screens facing each other, wherein the areas of the first and the second touch screens facing each other include a first area and a second area. The first and the second touch screens perform half-duplex or full-duplex communications through capacitive coupling between the first and the second areas. In an example of the present invention, the first and the second touch screens both have a plurality of conductive strips. The conductive strips in the first area of the first touch screen do not overlap with the conductive strips in the second area of the second touch screen.

The one or more transmitting conductive strips and the corresponding one or more receiving conductive strips of the first and second touch screens can be referred to as a group of communicating conductive strips. In an example of the present invention, the capacitive communications performed by the touch screens of the present invention can distinguish several groups of communicating conductive strips. They can perform capacitive communications simultaneously, thus carrying out multiple-bit parallel communications or multiple-group serial communications. In an example of the present invention, dual-rail communications can be performed by two groups of communicating conductive strips, in which only one group of a first group of communicating conductive strips and a second group of communicating conductive strips are transmitting signals at one time. For example, a '1' value is used to represent the case when the first group of communicating conductive strips are transmitting signals, and a '0' value is used to represent the case when the second group of communicating conductive strips are transmitting signals, so that proper transmissions of the signals are ensured.

Moreover, the first touch screen may first detect the portion of the touch screen approached or covered by a hand, and then provide a driving signal to one or more conductive strips approached or covered by the conductive medium for transmitting signals, this saves more power compared to full screen driving. Similarly, the second touch screen may first detect the portion of the touch screen approached or covered by a conductive medium, and receive signals through the one or more conductive strips covered by the conductive medium.

One with ordinary skill in the art can appreciate that the capacitive communications performed by the touch screens of the present invention can be used for transmitting audio data, image data, text data, command, or other information, and are not limited to just handheld devices, but especially applicable to mobile phones, tablets, touch pads, or other devices with touch screen(s). In addition, the aforementioned touch screens are not limited to projected capacitive touch screens, but may also be surface capacitive touch screens, resistive touch screens and the like. For example, the first touch screen performing communication as mentioned before is a surface capacitive touch screen, and the second touch screen is a projected capacitive touch screen.

Figure 7:
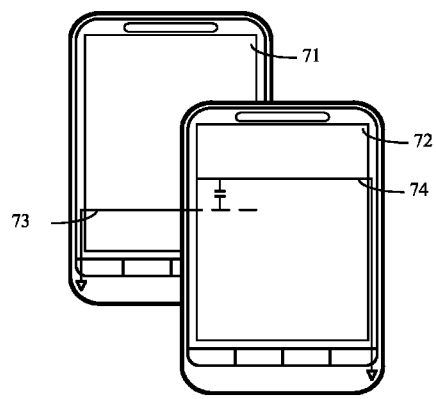
FIG. 7 is a schematic diagram depicting performing communication using touch screens proposed by a seventh embodiment of the present invention.

Referring to FIG. 7, a schematic diagram depicting performing communication using touch screens proposed by a seventh embodiment of the present invention is shown. While a capacitive touch screen is provided with a driving signal, a ground potential of a first touch screen 71 is provided to at least one conductive strip 73 of the first touch screen 71, and a ground potential of a second touch screen 72 is provided to at least one conductive strip 74 of the second touch screen 72, such that the conductive strips of the first touch screen 71 and the second touch screen 72 being provided with the ground potentials are capacitively coupled with each other, thereby reducing the difference in ground potentials between the first and the second touch screens.

For example, conductive strips of the first touch screen arranged in a first direction are provided with a driving signal, and conductive strips thereof arranged in a second direction are provided with the ground potential, whereas conductive strips of the second touch screen arranged in a first direction are provided with the ground potential, and conductive strips thereof arranged in a second direction are used for detecting transmitted data. As another example, a plurality of consecutively arranged conductive strips of the first touch screen are provided with the driving signal, while the rest of the conductive strips are provided with the ground potential, whereas conductive strips of the second touch screen not used for detecting signals are provided with the ground potential.

In a preferred mode of the present invention, the first touch screen has the abovementioned guarding conductive strips, and these guarding conductive strips are provided with the ground potential.

In an example of the present invention, which is in step 630 above, during communication, at least a portion of the first touch screen and at least a portion of the second touch screen are provided with a ground potential, respectively, and these portions of the first and the second touch screen being provided with the ground potentials are capacitively coupled with each other face-to-face, such that the ground potentials of the first and the second touch screens can be made closer to each other. The capacitive coupling between the first and the second touch screens is a direct capacitive coupling between the first and the second touch screens facing each other, wherein the areas of the first and the second touch screens facing each other include a first area and a second area. The first and the second touch screens perform half-duplex or full-duplex communications through the capacitive coupling in the first and the second areas.

In a first example of the present invention, the first and second touch screens both have a plurality of first conductive strips that will be provided with the driving signal during the detecting mode and a plurality of second conductive strips that will provide capacitive signals as a result of the driving signal. The first conductive strips are those performing the communications in the first and the second areas, and the second conductive strips are provided with the ground potentials during the detecting mode.

In a second example of the present invention, the first and the second touch screens both have the plurality of first conductive strips that will be provided with a driving signal during the detecting mode and a plurality of second conductive strips that will provide capacitive signals as a result of the driving signal. The second conductive strips are those performing the communications in the first and the second areas, and the first conductive strips are provided with the ground potentials during the detecting mode.

In a third example of the present invention, the first and the second touch screens both have a plurality of first conductive strips that will be provided with the driving signal during the detecting mode and a plurality of second conductive strips that will provide capacitive signals as a result of the driving signal, and the areas of the first and the second touch screens facing each other further include a third area. The second conductive strips are those performing the communications in the first and the second areas, and the second conductive strips in the third area are provided with the ground potentials during the detecting mode.

In a fourth example of the present invention, the first and the second touch screens both have a plurality of first conductive strips that will be provided with the driving signal during the detecting mode and a plurality of second conductive strips that will provide capacitive signals as a result of the driving signal, wherein during the communication mode, one of the first conductive strips and one of the second conductive strips are simultaneously provided with the driving signal, and another of the first conductive strips and another of the second conductive strips are simultaneously provided with the ground potentials.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A method for operating a touch screen, wherein said touch screen comprising a plurality of first conductive strips arranged parallel in a first direction and a plurality of second conductive strips arranged parallel in a second direction, and at least one external grounded conductive object on said touch screen is detected based on a reference value, said method comprising:
    (a) performing a one-dimensional (1D) mutual capacitive detection to obtain a first 1D sensing information within a predetermined period of time, wherein said 1D mutual capacitive detection including:
        simultaneously providing a driving signal to all of the first conductive strips;
        detecting mutual capacitive signals of all of the second conductive strips to generate the first 1D sensing information; and determining whether at least one external grounded conductive object is touching or approaching the touch screen based on the first 1D sensing information within said predetermined period of time;
(b) performing a two-dimensional (2D) mutual capacitive detection to obtain a 2D sensing information, said 2D mutual capacitive detection including:
sequentially providing a driving signal to one or more different conductive strips in the first conductive strips;
each time one or more different conductive strips in the first conductive strips being provided with the driving signal, detecting the signals of all of the second conductive strips to obtain a 1D sensing information corresponding to the one or more first conductive strips being provided with the driving signal generated based on the mutual capacitive signals of all of the second conductive strips; and
combining each 1D sensing information corresponding to the one or more first conductive strips being provided with the driving signal to generate a 2D sensing information;
(c) determining a location of the said at least one external grounded conductive object based on said 2D sensing information when said first 1D sensing information indicates that there is the at least one external grounded touching or approaching said touch screen;
(d) updating said reference values based on said 2D sensing information when said first 1D sensing information indicates that there is no at least one external grounded conductive object touching or approaching said touch screen.

2. The method of claim 1, wherein the location of each external grounded conductive object is determined from the amount of change between mutual capacitive signals of the 2D sensing information and the reference values.

3. The method of claim 1, wherein updating the reference values based on the 2D sensing information includes using the 2D sensing information as the new reference values or using an average of the 2D sensing information and the original reference values as the new reference values.

4. The method of claim 1, wherein the driving signal is provided to all of the first conductive strips at a first frequency, and when the touch screen is not touched or approached by any external grounded conductive object for a predetermined period of time or a predetermined number of times since providing the driving signal to all of the first conductive strips at the first frequency, the driving signal is provided to all of the first conductive strips at a second frequency instead, wherein the first frequency is faster than the second frequency.

5. The method of claim 4, wherein when an approach or a touch of an external grounded conductive object on the touch screen is determined while all of the first conductive strips are provided with the driving signal at the second frequency, the driving signal is provided to all of the first conductive strips at the first frequency again.

6. The method of claim 1, wherein the touch screen includes an insulating surface layer, a first sensing layer including the first conductive strips, an insulating layer, and a second sensing layer including the second conductive strips.

7. The method of claim 1, wherein the touch screen is a rectangle including two opposite long sides and two opposite short sides, wherein the first conductive strips are arranged in parallel with the two opposite short sides, and the second conductive strips are arranged in parallel with the two opposite long sides.

8. The method as recited in claim 1, wherein indicating no at least one external grounded conductive object touching or approaching said touch screen in step (d) including a water stain or an ungrounded conductive object touching said touch screen.

9. A device for detecting a touch screen in accordance with the present invention includes:
the touch screen including a plurality of first conductive strips arranged parallel in a first direction and a plurality of second conductive strips arranged parallel in a second direction; and
a controller for detecting the touch screen, including:
(a) performing a one-dimensional (1D) mutual capacitive detection to obtain a first 1D sensing information within a predetermined period of time, said 1D mutual capacitive detection including:
simultaneously providing a driving signal to all of the first conductive strips;
detecting mutual capacitive signals of all of the second conductive strips to generate the first 1D sensing information; and
determining whether at least one external grounded conductive object is touching or approaching the touch screen based on the first 1D sensing information within said predetermined period of time;
(b) performing a-two-dimensional (2D) mutual capacitive detection to obtain a 2D sensing information said 2D mutual capacitive detection including:
sequentially providing a driving signal to one or more different conductive strips in the first conductive strips;
each time one or more different conductive strips in the first conductive strips being provided with the driving signal, detecting the signals of all of the second conductive strips to obtain a 1D sensing information corresponding to the one or more first conductive strips being provided with the driving signal generated based on the mutual capacitive signals of all of the second conductive strips; and
combining each 1D sensing information corresponding to the one or more first conductive strips being provided with the driving signal to generate a 2D sensing information;
(c) determining a location of the said at least one grounded conductive object based on said 2D sensing information when said first 1D sensing information indicates that there is the at least one grounded conductive object touching or approaching said touch screen;
(d) updating said reference values based on said 2D sensing information when said first 1D sensing information indicates that there is no at least one grounded conductive object touching or approaching said touch screen.

10. The device of claim 9, wherein the location of each external grounded conductive object is determined from the amount of change between mutual capacitive signals of the 2D sensing information and the reference values.

11. The device of claim 9, wherein updating the reference values based on the 2D sensing information includes using the 2D sensing information as the new reference values or using an average of the 2D sensing information and the original reference values as the new reference values.

12. The device of claim 9, wherein the driving signal is provided to all of the first conductive strips at a first frequency, and when the touch screen is not touched or approached by any external grounded conductive object for a predetermined period of time or a predetermined number of times since providing the driving signal to all of the first conductive strips at the first frequency, the driving signal is provided to all of the first conductive strips at a second frequency instead, wherein the first frequency is faster than the second frequency.

13. The device of claim 12, wherein when an approach or a touch of an external grounded conductive object on the touch screen is determined while all of the first conductive strips are provided with the driving signal at the second frequency, the driving signal is provided to all of the first conductive strips at the first frequency again.

14. The device of claim 9, wherein the touch screen includes an insulating surface layer, a first sensing layer including the first conductive strips, an insulating layer, and a second sensing layer including the second conductive strips.

15. The device of claim 9, wherein the touch screen is a rectangle including two opposite long sides and two opposite short sides, wherein the first conductive strips are arranged in parallel with the two opposite short sides, and the second conductive strips are arranged in parallel with the two opposite long sides.

16. The device as recited in claim 9, wherein indicating no at least one external grounded conductive object touching or approaching said touch screen in step (d) including a water stain or an ungrounded conductive object touching said touch screen.

17. A method for operating a touch screen, wherein said touch screen comprising a plurality of first conductive strips arranged parallel in a first direction and a plurality of second conductive strips arranged parallel in a second direction, and at least one external grounded conductive object on said touch screen is detected based on a reference value, said method comprising:
performing a one-dimensional (1D) mutual capacitive detection to obtain a first 1D sensing information within a predetermined period of time, and said 1D mutual capacitive detection including:
simultaneously providing a driving signal to all of the first conductive strips;
detecting mutual capacitive signals of all of the second conductive strips to generate the first 1D sensing information; and
determining whether at least one external grounded conductive object is touching or approaching the touch screen based on the first 1D sensing information within said predetermined period of time; and
updating said reference values based on said 2D sensing information when said first 1D sensing information indicates that there is no at least one external grounded conductive object touching or approaching said touch screen, wherein said 2D sensing information is obtained by performing a two-dimensional (2D) mutual capacitive detection, said 2D mutual capacitive detection including:
sequentially providing a driving signal to one or more different conductive strips in the first conductive strips;
each time one or more different conductive strips in the first conductive strips being provided with the driving signal, detecting the signals of all of the second conductive strips to obtain a 1D sensing information corresponding to the one or more first conductive strips being provided with the driving signal generated based on the mutual capacitive signals of all of the second conductive strips; and
combining each 1D sensing information corresponding to the one or more first conductive strips being provided with the driving signal to generate a 2D sensing information.

18. The method of claim 17, further comprising:
determining a location of the said at least one external grounded conductive object based on said 2D sensing information when said first 1D sensing information indicates that there is the at least one external grounded touching or approaching said touch screen.

19. A device for detecting a touch screen in accordance with the present invention includes:
the touch screen including a plurality of first conductive strips arranged parallel in a first direction and a plurality of second conductive strips arranged parallel in a second direction; and
a controller for detecting the touch screen, including:
performing a one-dimensional (1D) mutual capacitive detection to obtain a first 1D sensing information within a predetermined period of time, and said 1D mutual capacitive detection including:
simultaneously providing a driving signal to all of the first conductive strips;
detecting mutual capacitive signals of all of the second conductive strips to generate the first 1D sensing information; and
determining whether at least one external grounded conductive object is touching or approaching the touch screen based on the first 1D sensing information within said predetermined period of time; and
updating said reference values based on said 2D sensing information when said first 1D sensing information indicates that there is no at least one external grounded conductive object touching or approaching said touch screen, wherein said 2D sensing information is obtained by performing a two-dimensional (2D) mutual capacitive detection, said 2D mutual capacitive detection including:
sequentially providing a driving signal to one or more different conductive strips in the first conductive strips;
each time one or more different conductive strips in the first conductive strips being provided with the driving signal, detecting the signals of all of the second conductive strips to obtain a 1D sensing information corresponding to the one or more first conductive strips being provided with the driving signal generated based on the mutual capacitive signals of all of the second conductive strips; and
combining each 1D sensing information corresponding to the one or more first conductive strips being provided with the driving signal to generate a 2D sensing information.

20. The device of claim 19, wherein said controller further includes:
determining a location of the said at least one external grounded conductive object based on said 2D sensing information when said first 1D sensing information indicates that there is the at least one external grounded touching or approaching said touch screen.

* * * * *